(12) United States Patent
Mitsutake et al.

(10) Patent No.: US 6,240,460 B1
(45) Date of Patent: May 29, 2001

(54) METHOD AND SYSTEM FOR DATA TRANSMISSION ACCORDANCE WITH THE FORM OF THE DATA TRANSMISSION BASED ON CONTROL INFORMATION EXCHANGED BETWEEN APPLICATIONS OF A DATA TRANSMITTER AND A DATA RECEIVER BEFORE DATA TRANSMISSION IS STARTED

(75) Inventors: Katsuya Mitsutake; Koh Kamizawa; Yuji Kozawa; Takanori Hisanaga; Yasutoshi Maeda; Fumiyoshi Kawase; Takahiko Hayano, all of Kanagawa (JP)

(73) Assignee: Fuji Xerox, Ltd., Tokyo (JP)

( * ) Notice: Subject to any disclaimer, the term of this patent is extended or adjusted under 35 U.S.C. 154(b) by 0 days.

(21) Appl. No.: 08/788,464

(22) Filed: Jan. 29, 1997

(30) Foreign Application Priority Data

Feb. 2, 1996 (JP) .................................................. 8-017949

(51) Int. Cl.[7] .............................. G06F 15/16; H04L 12/26
(52) U.S. Cl. .......................... 709/235; 709/231; 370/230
(58) Field of Search ...................... 395/200.76, 200.77, 395/200.61, 200.62, 200.63, 200.64, 200.65; 709/246–247, 231–235; 370/229–230, 235–236, 395

(56) References Cited

U.S. PATENT DOCUMENTS

| | | | |
|---|---|---|---|
| 5,367,517 | * | 11/1994 | Cidon et al. ............................ 370/54 |
| 5,553,083 | * | 9/1996 | Miller .................................... 714/748 |
| 5,557,320 | * | 9/1996 | Krebs ..................................... 348/12 |
| 5,675,732 | * | 10/1997 | Majeti et al. ..................... 395/200.65 |
| 5,727,002 | * | 3/1998 | Miller et al. ......................... 714/748 |
| 5,737,495 | * | 4/1998 | Adams et al. ........................ 707/104 |
| 5,761,438 | * | 6/1998 | Sasaki .............................. 395/200.77 |
| 5,768,527 | * | 6/1998 | Zhu et al. ........................ 395/200.61 |
| 5,784,572 | * | 6/1998 | Rostoker et al. ................ 395/200.77 |
| 5,793,380 | * | 8/1998 | Glaser et al. .................... 395/200.61 |
| 5,796,724 | * | 8/1998 | Rajamani et al. ..................... 370/263 |
| 5,850,398 | * | 12/1998 | King, Jr. ............................... 370/412 |
| 5,859,980 | * | 1/1999 | Kalkunte .............................. 709/231 |
| 5,875,175 | * | 2/1999 | Sherer et al. ......................... 370/230 |
| 5,878,029 | * | 3/1999 | Hasegawa et al. ................... 370/236 |
| 5,884,037 | * | 3/1999 | Aras et al. ............................ 709/226 |
| 5,889,779 | * | 3/1999 | Lincoln ................................ 370/398 |
| 5,907,556 | * | 5/1999 | Hisanaga et al. .................... 370/468 |
| 5,913,041 | * | 6/1999 | Ramanathan et al. ............... 709/233 |
| 5,917,822 | * | 6/1999 | Lyles et al. .......................... 370/395 |
| 5,918,020 | * | 6/1999 | Blackard et al. .................... 709/228 |

(List continued on next page.)

FOREIGN PATENT DOCUMENTS 7-219787  8/1995  (JP) .

OTHER PUBLICATIONS

Maruzen Co., Ltd., 1985, "Local Area Network—Outline of Ethernet–," A. Uetani, pp. 86, 87, 92, 93.

*Primary Examiner*—Zarni Maung
*Assistant Examiner*—Andrew Caldwell
(74) *Attorney, Agent, or Firm*—Oliff & Berridge, PLC

(57) ABSTRACT

A data transmission control information acquisition section generates data transmission control information based on control information exchanged between applications of a data transmitter and a data receiver before data transmission is started. A data transfer control section determines a bandwidth to be used by the data transmission, transmission start time, etc. in a shared transmission medium in a unified manner based on the data transmission control information and current bandwidth use conditions, and transmits the thus-determined information to the data transmitter. The data transmitter transmits data to the data receiver via the transmission medium under unified management.

8 Claims, 18 Drawing Sheets

U.S. PATENT DOCUMENTS

| | | | |
|---|---|---|---|
| 5,920,700 | * | 7/1999 | Gordon et al. .................... 709/226 |
| 5,920,701 | * | 7/1999 | Miller et al. ...................... 709/228 |
| 5,933,835 | * | 9/1999 | Adams et al. ..................... 707/104 |
| 5,951,646 | * | 9/1999 | Brandon ............................ 709/231 |
| 6,003,086 | * | 12/1999 | Mitsutake et al. ................ 709/229 |
| 6,011,590 | * | 1/2000 | Saukkonen ........................ 348/419 |

* cited by examiner

METHOD AND SYSTEM FOR DATA TRANSMISSION ACCORDANCE WITH THE FORM OF THE DATA TRANSMISSION BASED ON CONTROL INFORMATION EXCHANGED BETWEEN APPLICATIONS OF A DATA TRANSMITTER AND A DATA RECEIVER BEFORE DATA TRANSMISSION IS STARTED

FIELD OF THE INVENTION

This invention relates to a data transmission system and method for performing contention control on data transmission attempts when a plurality of terminals transmit data at an arbitrary time point via a shared network.

DESCRIPTION OF THE RELATED ART

[Transmission Bandwidth Contention]

When a plurality of terminals execute data transmission at an arbitrary time point on a single network, transmission bandwidth contention may occur among data transmission attempts. First, this point will be discussed with reference to FIG. 2.

In general, a network consists of a plurality of transmission media. A plurality of terminals are connected to the network and data transmission is executed among the terminals via transmission media making up the network. The transmission bandwidth is represented by the transmission data amount per unit time. The transmission capability of a transmission medium has a limit and the maximum transmission bandwidth Rmax is a certain finite value.

The bandwidth of a transmission medium is shared by a plurality of data transmission attempts, and in each data transmission a bandwidth is used in accordance with the transmission data amount per unit time. The bandwidth use amount in each data transmission, r(t), changes with time.

If the total of the bandwidth use amounts of data transmission attempts sharing the bandwidth of the same transmission medium, Σr(t), is greater than the maximum transmission bandwidth of the transmission medium, Rmax, the data transmission attempts contend with each other for the shared bandwidth. This is called contention.

The contention occurs for the following reasons. The nucleus of data transmission is applications operating on the terminals connected to the network. Generally, a plurality of applications operate on each terminal. Of course, a plurality of applications operate when viewed from the entire network. The data transmission conditions of each application are characterized by the start time, the end time, a transmission terminal, a reception terminal, a route, and use bandwidth variation with time. Some applications involving data transmission have the data transmission conditions that cannot be predicted, such as telnet with human being's interaction as a transmission data source.

On the other hand, general data transmission is realized by a functional layered structure typified by the ISO 7-layer reference model. In the general conventional networks, applications operating on the networks are undefined and in the functional layer of data transmission control, control cannot be performed based on information that can be obtained only in a specific application. That is, when viewed from the side of a transmission medium which is a functional layer lower than the application layer, the data transmission conditions from each application sharing the transmission medium for executing data transmission are all handled as information that cannot be acquired.

Thus, it is impossible to grasp all the data transmission conditions such as the start time, the end time, a transmission terminal, a reception terminal, a route, and use bandwidth variation with time of each data transmission in the conventional networks. The information is predicted statistically or in probability.

Applications involving data transmission on the network generally operate separately and execute data transmission independently of the data transmission conditions of other applications. Thus, the data transmission attempts are independent of each other and are controlled plurally at their respective transmission ends.

Paying attention to one data transmission in such conditions, the bandwidth R(t) that can be used in the transmission changes with time because of tradeoffs with the bandwidth use conditions of other data transmission attempts. However, at the transmission end of the data transmission, the bandwidth use conditions of other data transmission attempts cannot be grasped, and other data transmission attempts are controlled separately at their respective transmission ends.

Thus, at the transmission end of the data transmission, the bandwidth use conditions of other data transmission attempts must be predicted to control the bandwidth use amount of the data transmission. If the prediction is erroneous, the total of the bandwidth use amounts of data transmission attempts sharing the same transmission medium, Σr(t), may sometimes exceed the maximum transmission bandwidth of the transmission medium, Rmax.

Such contention lowers the bandwidth use efficiency and should be avoided. That is, if a bandwidth required for transmission is not obtained because of bandwidth contention, data to be transmitted is lost. Generally, if data is lost, it is resent, whereby the effective bandwidth use efficiency (i.e., (data amount resulting in success in transmission)/(bandwidth amount used for transmission)) lowers. To suppress contention and efficiently use the maximum transmission bandwidth of each transmission medium limited, it is necessary to equally control the current bandwidth R(t) that can be used for data transmission and the bandwidth r(t) used by the data transmission at the sending end of the data transmission.

[Conventional Contention Avoidance Schemes]

Next, contention avoidance schemes in the conventional transmission technologies will be discussed. To share a single transmission medium for executing a plurality of data transmission attempts, switching technologies for allocating bandwidths among the data transmission attempts. The switching technologies are roughly classified into packet switching and circuit switching.

(1) Packet Switching

Data is divided into small units called packets for transmission. A bandwidth is allocated to a packet each time arriving at each transmission medium on the transmission route of the packet. This means that the bandwidth of each transmission medium is dynamically allocated in packet units among the data transmission attempts sharing the bandwidth at each point in time in the packet switching.

(2) Circuit Switching

Before data transmission, a bandwidth required for the transmission is previously allocated at each transmission medium on the route of the data transmission. This is called line connection. In contrast, releasing the bandwidth allocated at each transmission medium on the route is called line disconnection. Since the bandwidth at each transmission medium on the route of the data transmission is occupied during the period between the line connection and disconnection, the bandwidth that can be used for the transmission, R(t), becomes constant. This means that the bandwidth of each transmission medium is allocated comparatively statically in line units among the data transmission attempts sharing the bandwidth.

The control schemes to avoid bandwidth contention in the respective switching schemes correspond to the following items that are described in terms of control.

(1) Variable Value Control

A controlled variable (i.e., a bandwidth amount used for transmission at time t, r(t)) is manipulated for a changing target value (i.e., a bandwidth amount that can be used for transmission at time t, R(t)) and control is performed so that the difference |R(t)−r(t)| becomes zero.

(2) Constant Value Control

A controlled variable r(t) is manipulated for a constant target value Rconst and control is performed so that the difference |Rconst−r(t)| becomes zero. Control accuracy can be easily enhanced.

The conventional technologies have the following features.

(1) Packet Switching

Since a bandwidth is dynamically allocated to transmission actually using a transmission medium bandwidth, the maximum transmission bandwidth of the transmission medium, Rmax, can be used without waste. On the other hand, however, variable value control of the use bandwidth needs to be performed and at the time, excess or shortage may occur in manipulation of the controlled variable, as shown in FIG. 3.

i) R(t)−r(t)<0 (Controlled Variable is too Large)

A transmission bandwidth contention occurs. Generally, data is buffered before and after a transmission medium for averaging the bandwidth use amount relative to the time, thereby absorbing the too large controlled variable. However, buffer contention may also occur like bandwidth contention. If the buffer length is sufficiently long, buffering causes a data transmission delay to increase. Generally, the data transmission delay increases with an increase in bandwidth contention and data transmission delay variations also enlarge accordingly.

ii) R(t)−r(t)>0 (Controlled Variable is too Small)

A bandwidth not used for transmission occurs and the bandwidth use efficiency lowers.

(2) Circuit Switching

When a line is connected, a bandwidth required for transmission needs to be previously allocated in each transmission medium on the route for the line connection. The time required for the bandwidth allocation, namely, a line connection delay (see FIG. 4) is undefined. If a line connection cannot be established within a given time on general telephone lines, etc., a call loss (line connection failure) occurs and again an attempt is made to establish a line connection. However, once the line is connected, a bandwidth is guaranteed for the line and highly accurate controlled variable manipulation is enabled under constant value control.

However, one transmission occupies the bandwidth during the line connection and if a bandwidth not actually used exists, it cannot be used for another transmission. Thus, the bandwidth use efficiency lowers.

[Limitations of Conventional Schemes]

The conventional schemes have the following limitations.

(1) Packet Switching

As described earlier, hitherto it has been impossible to predict target value change for performing variable value control of a use bandwidth. Thus, in the packet switching, feedback control (also called closed loop control) must be performed, as shown in FIG. 5. In the feedback control, the difference between a target value and a controlled variable at an observation point is observed and is returned to a control point as feedback information. At the control point, the controlled variable is manipulated based on the feedback information. The variable value control of a use bandwidth using feedback is roughly classified into the following two types depending on the feedback information observation point.

a. Type wherein the use conditions of a shared bandwidth are observed in transmission media sharing the bandwidth and the observation result is fed back to the transmission end The CSMA/CD scheme in Ethernet, the CI scheme using rm cells in ATM-ABR service, the ER scheme, and the like are available as typical technologies actually applied.

CSMA/CD: Carrier Sense Multiple Access with Collision Detection

ATM: Asynchronous Transfer Mode

ABR: Available Bit Rate rm: Resource management

CI: Congestion Indication

ER: Explicit Rate b. Type wherein a data loss is detected at the data reception end and the detection result is fed back to the data transmission end at which the data loss is assumed to result from bandwidth contention The Slow Start scheme in TCP is a typical technology actually applied.

TCP: Transmission Control Protocol a-1. CSMA/CD Scheme

Ethernet is a passive physical transmission medium of bus type and enables single packets, called frames in Ethernet, to be transmitted at the same time, thus performs distributed contention control at each transmission end in frame units.

At the frame transmission end, a carrier signal on the transmission medium is sensed and the transmission conditions of another frame are sensed. If another frame exists on the transmission medium, the frame at the transmission end is transmitted. If a plurality of terminals then send a frame at the same time, a frame collision occurs.

If a frame collision is detected at each transmission end, the sending is interrupted and a period over which the collision probability is expected to be small is determined according to a Binary Exponential Backoff algorithm. Then, again the frame sending is tried.

a-2. CI Scheme with rm Cells (ATM-ABR)

The ATM uses an active full-duplex (simultaneous communication in both directions) transmission medium called a packet (called cell in the ATM) exchange. A cell exchange temporarily buffers cells transmitted from terminals and switches them into the routes to their respective destinations. Thus, the transmission bandwidth use amount can be controlled by handling the cell sending intervals at the transmission ends.

In the ATM, a transmission bandwidth contention (called congestion in the ATM) in switching in the exchange and at cell switching destinations can occur.

An rm cell is sent at constant intervals from each transmission end via an exchange on the data transmission route to the reception end, then is returned to the transmission end.

In the CI scheme, if congestion is sensed in an exchange on the data transmission route, then the current rm cell passing through the switching scheme is used to notify the transmission terminal that congestion has occurred. At the transmission end, when the congestion occurrence notification is received from the rm cell, the use bandwidth is reduced to the bandwidth use amount in which the congestion can be expected to be avoided in probability and when the congestion notification with the rm cell is canceled, the use amount is increased gradually.

To execute data transmission after stop over a certain period, the bandwidth use amount is also increased gradually from the bandwidth use amount in which it is expected that no congestion is caused to occur.

a-3. ER Scheme with rm Cells (ATM-ABR)

In the ER scheme, if congestion is sensed in an exchange on the data transmission route, then the current rm cell passing through the exchange is used to send the bandwidth use amount in which the congestion can be expected to be avoided, from the exchange to the transmission end. At the transmission end, when the use bandwidth specification is received from the rm cell, the use bandwidth is handled based on the specification.

b-1. Slow Start Scheme (TCP)

The TCP is a transport protocol for guaranteeing the reliability of data transmission. In the standard TCP, a data reception terminal only notifies the transmission end of data reception. A data loss is detected indirectly by the fact that the data reception notification from the reception terminal times out. If a data loss is detected at the data transmission end, the lost data is resent to the reception end.

In the Slow Start scheme, if a data loss is detected at the data transmission end, it is assumed to have resulted from a bandwidth contention, and the data sending intervals are adjusted.

Specifically, first, data is consecutively sent only in one packet. If reception of the data is acknowledged, next two packets of data are sent consecutively. Thus, whenever each packet reception is acknowledged, the number of packets sent consecutively is incremented by one.

To eliminate a variable value control error, the feedback control needs to directly observe a target value and precisely feed back the difference between the target value and a controlled variable, as shown in a-3. ER scheme with rm cells (ATM-ABR).

However, in the actual control system, distance L exists between a control point and an observation point and transfer of feedback information between the control and observation points involves a delay of $\Delta t=$(distance L)/(light speed c) at the minimum. This means that the controlled variable observed at the observation point at time t is the controlled variable $r(t-\Delta t)$ manipulated at the control point at time $t-\Delta t$ and that the feedback information used to determine the controlled variable is an observation value $2\Delta t$ before.

Therefore, even if the actual feedback control system executes precise feedback, $\Delta t=0$ does not result, thus precise variable value control, namely, $|R(t)-r(t-\Delta t)|=0$ is never attained.

(2) Circuit Switching

As described earlier, in the circuit switching, the line connection time for previously allocating a bandwidth required for transmission is undefined in each transmission medium on the route for the line connection.

A similar discussion on the variable value control in the packet switching is applied to this problem.

This means that in the packet switching, a transmission bandwidth contention occurs in packet units and data is lost. In contrast, in the circuit switching, a contention occurs in line (call) units, resulting in a call loss. The packet switching and the circuit switching differ only in contention occurrence unit size (packet or line) and involve the same essence of the problem.

In conclusion, the following problems are inevitable in the conventional packet switching:

1. The longer the transmission route distance, the wider is a variable value control error and as the transmission bandwidth use amount approaches the maximum transmission bandwidth, conditions for absorbing a variable value control error become stricter.

2. Thus, a data loss probability and a data transmission delay grow.

3. Resultantly, the bandwidth use efficiency lowers and the data transmission time increases. Data transmission time variations also grow and it becomes difficult to predict the end time of data transmission.

The following problems are inevitable in the conventional circuit switching:

1. As the number of transmission media on a transmission line increases and the transmission bandwidth use amount approaches the maximum transmission bandwidth, it becomes more difficult to allocate a necessary bandwidth.

2. Thus, a call loss probability and a line connection delay grow.

3. Resultantly, the data transmission time increases. Line connection delay variations also grow and it becomes difficult to predict the end time of data transmission.

The causes, which are common to the packet switching and the circuit switching, of the above problems are as follows:

1. It is impossible to grasp all the data transmission conditions such as the start time, the end time, a transmission terminal, a reception terminal, a route, and use bandwidth change of each data transmission and these information pieces can be predicted only statistically or in probability, and that 2. Data transmission attempts are independent of each other and are controlled plurally at their respective transmission ends.

Therefore, in every switching scheme in the conventional contention control, as the total of the transmission bandwidths used by data transmission attempts approaches the maximum transmission bandwidth of the transmission medium shared by the data transmission attempts, namely, the transmission bandwidth load increases, the data transmission time per data transmission grows and it becomes more difficult to predict the end time of the data transmission.

SUMMARY OF THE INVENTION

It is therefore an object of the invention to provide data transmission technologies by which high bandwidth use efficiency and precise data transmission time prediction can be accomplished independently of a transmission bandwidth load.

The basic approach to the end is described below:

1. The transmission conditions of the start time, the end time, the transmission terminal, the reception terminal, the route, and use bandwidth change of each data transmission are grasped and are definitely known.

2. Data transmission attempts are controlled in a unified manner.

Plural control requires variable value control with the bandwidth use amount in each data transmission at a control point of each data transmission as a controlled variable and an available bandwidth changing every moment because of tradeoffs with the bandwidth use conditions of other data transmission attempts as a target value.

In contrast, unified control applies to the bandwidth use conditions of all data transmission attempts. That is, focusing attention on the control point for performing the unified control, constant value control may be performed with the controlled variable as the bandwidth use amounts of all transmission attempts and the target value as the maximum transmission bandwidth of a transmission medium.

In the constant value control, the target value does not change with time, so that precise control can be performed independently of control information propagation delay $\Delta t$.

The following conditions must be satisfied to realize the approach:

1. The bandwidth use conditions of data transmission attempts can be acquired precisely.

In conventional general networks, applications involving data transmission are undefined and information of the start time, the end time, the transmission terminal, the reception terminal, the route, use bandwidth change, etc., cannot completely be acquired.

However, focusing attention on such applications as file transfer and a print service among applications involving data transmission, the whole of the data to be transmitted exists at the transmission end before data transmission is started. The data transmission has the following features:

1. Generally, the transmission data amount is known. If the data amount is not known, the data amount is finite and the transmission termination clearly exists. In such many applications, control information of the transmission data amount, etc., is exchanged between the transmission and reception terminals before data transmission is started.

Specific control information examples are given below.

In a standard file transfer protocol ftp, when data transmission is started, a notification of the data amount of the file to be transferred is sent from the data transmission end to the data reception end.

A control file used by a print spooler of a UNIX operating system contains information such as the number of data files transmitted between printer spools for printing and the data amount of each file.

Further, in specification of ISO 10175: DPA (Document Printing Application), print job details such as the data amount, the number of pages, the data amount and format for each page, the number of output copies, and the output time limit of the document to be printed out can be indicated in the contents of print request information transmitted from a client to a print server at the print-out time.

Thus, the bandwidth use conditions of data transmission can be derived based on such application control information.

1-2. A transmission route can be determined at the point in time at which control information is exchanged between the transmission and reception terminals before the data transmission is started.

1-3. In such an application, transmission data already exists and use bandwidth change is not caused by preparation of the data and can be made constant.

Therefore, if the data transmission applications sharing the same transmission medium are limited to those having the above-mentioned data transmission characteristics, the use bandwidth conditions of all data transmission attempts can be known precisely.

2. The conditions of data transmission attempts can be grasped in a unified manner.

In conventional general networks, applications involving data transmission are undefined and it is impossible to grasp the data transmission conditions in a unified manner. Thus, the data transmission conditions are controlled at the transmission end of each data transmission independently and plurally.

However, in applications of client-server type, such as a print service, all data transmission attempts center on the server. Therefore, control information including the start times, the end times, the transmission terminals, the reception terminals, the routes, the transmission data amounts, and use bandwidth change of data transmission attempts centering on the server can be easily obtained at the server.

To grasp the actual bandwidth use conditions of transmission media making up a network, essentially it is necessary to observe the bandwidth use conditions at the locations of the transmission media. However, generally, it is impossible to observe and totalize the use conditions of all transmission media making up the network at the same time.

However, if the configuration and transmission capabilities of the transmission media in the network are grasped and then the bandwidth use conditions of each data transmission in the server are observed, the bandwidth use conditions on each transmission medium in the network can be guessed.

3. Transmitted data allows use bandwidth adjustment and can be controlled.

In conventional general networks, applications involving data transmission are undefined and all data transmission requests made by applications are handled alike as promptly and fast as possible.

However, applications of file transfer, a print service, etc. among the applications involving data transmission have a comparatively large allowable range of data transmission delay, thus the data transmission start time and termination time can be adjusted.

The amounts of data transmitted by the applications are comparatively large and the bandwidth use condition change span is long, thus control is also comparatively easy.

After consideration of the above approach and its implementation conditions, the following conclusion has been reached. If attention is paid to the data characteristics and the concentrated form of data transmission of client-server type applications such as a print service, it is found that they satisfy the requirements for providing unified transmission control based on definite bandwidth use conditions. Thus, in the network where data transmission attempts are mainly executed by the applications satisfying those requirements, contention avoidance can be realized by applying the unified transmission control based on the definite bandwidth use conditions.

For control information transmission in the applications and data transmission executed by applications not satisfying the requirements, if the bandwidth use amount is sufficiently small as compared with the bandwidth use amount in the data transmission applications satisfying the requirements, it can be allowed as an estimation error of the bandwidth use conditions.

For example, the bandwidth use amount of an interactive application such as telnet generally used on the conventional LAN can be sufficiently ignored for an application such as a high-speed print service of high-resolution color images for transmitting data of several ten megabytes a second over several ten seconds.

The invention provides the following systems, devices, methods, and program products according to the above-mentioned approach.

A first method is provided for transmitting data between a data transmitter and a data receiver via a data transmission medium including generating characteristic information of data transmission from the data transmitter to the data receiver before execution of the data transmission, storing observed current bandwidth use conditions of the data transmission medium, determining a detailed form of the data transmission based on the observed current bandwidth use conditions and the characteristic information of the data transmission and transmitting the data from the data transmitter in accordance with the detailed form of the data transmission.

A second method for controlling a data transmission is provided including determining a detailed form of a data transmission from a data transmitter to a data receiver based on characteristic information of the data transmission and observed current bandwidth use conditions of the data transmission medium before execution of the data transmission, where the characteristic information of the data transmission contains an identifier of the data transmitter and a data amount of the data transmission, and further where the detailed form of the data transmission contains data transmission start time and a transmission bandwidth used, and informing the data transmitter of the detailed form of the data transmission.

A third method for transmitting data in a data transmission system is provided including generating observed current bandwidth use conditions of a data transmission medium and other information necessary to determine a detailed form of data transmission, transmitting the observed current bandwidth use conditions and other information for determining a detailed form of the data transmission, wherein the detailed form of the data transmission contains data transmission start time and a transmission bandwidth used, receiving a notification of the detailed form of the data transmission and transmitting data in accordance with the received detailed form of the data transmission.

A method for receiving data in a data transmission system is provided including determining a detailed form of data transmission from a data transmitter to the data receiver based on characteristic information of the data transmission and observed current bandwidth use conditions of the data transmission medium before execution of the data transmissions where the characteristic information of the data transmission contains an identifier of the data transmitter and a data amount of the data transmission, and further where the detailed form of the data transmission contains data transmission start time and a transmission bandwidth used, and informing the data transmitter of the detailed form of the data transmission.

Still another method of transmitting data over a data transmission system is provided including generating characteristic information of data transmission from a data transmitter to a data receiver before execution of the data transmission, where the characteristic information of the data transmission contains an identifier of the data transmitter and a data amount of the data transmission and transmitting the characteristic information of the data transmission. The method further includes receiving at a controller the characteristic information of the data transmission, storing current bandwidth use conditions of the data transmission medium, determining a detailed form of the data transmission based on the current bandwidth use conditions and the characteristic information of the data transmission, where the detailed form of the data transmission contains data transmission start time and a transmission bandwidth used and transmitting information concerning the detailed form of the data transmission. The method still further includes receiving the information at a transmitter concerning the detailed form of the data transmission, transmitting data based on the information concerning the detailed form of the data transmission.

Another method of transmitting data over a data transmission system is provided including generating characteristic information at a transmitter of data transmission from the data transmitter to a data receiver before execution of the data transmission, where the characteristic information of the data transmission contains an identifier of the data transmitter and a data amount of the data transmission and transmitting the characteristic information of the data transmission. The method further includes receiving the characteristic information of the data transmission at a controller, storing observed current bandwidth use conditions of the data transmission medium, determining a detailed form of the data transmission based on the observed current bandwidth use conditions and the characteristic information of the data transmission, where the detailed form of the data transmission contains data transmission start time and a transmission bandwidth used, and transmitting information concerning the detailed form of the data transmission. The method still further includes receiving the information concerning the detailed form of the data transmission at the transmitter and transmitting data based on the information concerning the detailed form of the data transmission.

A computer program product for controlling a computer system is also provided which includes a storage medium that can be read by input means of the computer system and a program stored on the storage medium, for causing the computer system to execute data transmission from a data transmitter to a data receiver via a data transmission medium, the program causing the computer system to execute the steps of: (1) determining a detailed form of data transmission from the data transmitter to the data receiver based on characteristic information concerning the data transmission and observed current bandwidth use conditions of the data transmission medium before execution of the data transmission, where the characteristic information of the data transmission contains an identifier of the data transmitter and a data amount of the data transmission, where the detailed form of the data transmission contains data transmission start time and a transmission bandwidth used, and (2) informing the data transmitter of the detailed form of the data transmission.

According to a first aspect of the invention, there is provided a data transmission system including a data transmitter, a data receiver, and a data transmission medium for transmitting data from the data transmitter to the data receiver, comprising means for generating characteristic information of data transmission from the data transmitter to the data receiver before execution of the data transmission; means for storing current bandwidth use conditions of the data transmission medium; means for determining a detailed form of the data transmission based on the current bandwidth use conditions and the characteristic information of the data transmission; and means for transmitting the data from the data transmitter in accordance with the detailed form of the data transmission.

The characteristic information of data transmission may be an identifier of the data transmitter and the data amount of the data transmission. The detailed form of the data transmission may be data transmission start time and a transmission bandwidth used.

According to the above system, the bandwidth use conditions are acquired precisely, data transmission conditions are managed in a unified manner, and data communication is adjusted properly, whereby the bandwidth can be used efficiently.

In the above system, the characteristic information of data transmission may be generated based on the application control information exchanged between an application of the data transmitter and an application of the data receiver. In this case, the application control information may be the data amount of a file to be transferred.

According to a second aspect of the invention, a data transmission controller in a data transmission system further including a data transmitter, a data receiver, and a data transmission medium for transmitting data from the data transmitter to the data receiver, the data transmission controller comprising means for determining a detailed form of data transmission from the data transmitter to the data receiver based on characteristic information of the data transmission and current bandwidth use conditions of the data transmission medium before execution of the data transmission, wherein the characteristic information of the data transmission contains an identifier of the data transmitter and amount of data of the data transmission and further wherein the detailed form of the data transmission contains data transmission start time and a transmission bandwidth used; and means for informing the data transmitter of the detailed form of the data transmission.

In a third aspect of the invention, there is provided a data transmitter in a data transmission system further including a data receiver and a data transmission medium for transmitting data from the data transmitter to the data receiver, the data transmitter comprising means for generating current bandwidth use conditions of the data transmission medium and other information necessary to determine a detailed form of data transmission, wherein the detailed form of the data transmission contains data transmission start time and a transmission bandwidth used; means for transmitting the current bandwidth use conditions and other information to means for determining a detailed form of the data transmission; means for receiving a notification of the detailed form of the data transmission; and means for transmitting data in accordance with the received detailed form of the data transmission.

In a fourth aspect of the invention, there is provided a data receiver in a data transmission system further including a data transmitter and a data transmission medium for transmitting data from the data transmitter to the data receiver, the data receiver comprising means for determining a detailed form of data transmission from the data transmitter to the data receiver based on characteristic information of the data transmission and current bandwidth use conditions of the data transmission medium before execution of the data transmission; and means for informing the data transmitter of the detailed form of the data transmission.

According to a fifth aspect of the invention, there is provided a data transmission system comprising a data transmitter, a data receiver, and a data transmission medium for transmitting data from the data transmitter to the data receiver, wherein the data receiver comprises means for generating characteristic information of data transmission from the data transmitter to the data receiver before execution of the data transmission; means for storing current bandwidth use conditions of the data transmission medium; means for determining a detailed form of the data transmission based on the current bandwidth use conditions and the characteristic information of the data transmission; and means for transmitting information concerning the detailed form of the data transmission; and the data transmitter comprises means for receiving the information concerning the detailed form of the data transmission; and means for causing the data transmitter to transmit data based on the information concerning the detailed form of the data transmission.

In the fifth aspect of the invention, the data transmitter may further comprise means for transmitting information concerning a characteristic change in the data transmission of the data transmitter, and the data receiver may further comprise means for receiving the information concerning characteristic change in the data transmission.

According to a sixth aspect of the invention, there is provided a data transmission system comprising a data transmitter, a data receiver, and a data transmission medium for transmitting data from the data transmitter to the data receiver, wherein the data transmitter comprises means for generating characteristic information of data transmission from the data transmitter to the data receiver before execution of the data transmission; and means for transmitting the characteristic information of the data transmission; the data receiver comprises means for receiving the characteristic information of the data transmission; means for storing current bandwidth use conditions of the data transmission medium; means for determining a detailed form of the data transmission based on the current bandwidth use conditions and the characteristic information of the data transmission; and means for transmitting information concerning the detailed form of the data transmission; and the data transmitter further comprises means for receiving the information concerning the detailed form of the data transmission; and means for causing the data transmitter to transmit data based on the information concerning the detailed form of the data transmission.

According to a seventh aspect of the invention, there is provided a data transmission system comprising a data transmitter, a data receiver, and a data transmission medium for transmitting data from the data transmitter to the data receiver, wherein the data receiver comprises means for receiving characteristic information of data transmission generated by an application of the data transmitter; means for storing current bandwidth use conditions of the data transmission medium; means for determining a detailed form of the data transmission based on the current bandwidth use conditions and the characteristic information of the data transmission; and means for transmitting information concerning the detailed form of the data transmission; and the data transmitter comprises means for receiving the information concerning the detailed form of the data transmission; and means for causing the data transmitter to transmit data based on the information concerning the detailed form of the data transmission.

In the seventh aspect of the invention, the data receiver may further comprise means for transmitting the information concerning the detailed form of the data transmission to the application.

According to an eighth aspect of the invention, there is provided a data transmission system comprising a data transmitter, a data receiver, a data transmission medium for transmitting data from the data transmitter to the data receiver, and a data transmission controller for controlling transmission of the data, wherein the data receiver comprises means for generating characteristic information of data transmission from the data transmitter to the data receiver before execution of the data transmission; and means for transmitting the characteristic information of the data transmission; the data transmission controller comprises means for receiving the characteristic information of the data transmission; means for storing current bandwidth use conditions of the data transmission medium; means for determining a detailed form of the data transmission based on the current bandwidth use conditions and the characteristic information of the data transmission; and means for transmitting information concerning the detailed form of the data transmission; and the data transmitter comprises means for receiving the information concerning the detailed form of the data transmission; and means for causing the data transmitter to transmit data based on the information concerning the detailed form of the data transmission.

In the eighth aspect of the invention, the data transmitter may further comprise means for transmitting information concerning a characteristic change in the data transmission of the data transmitter, and the data transmission controller may further comprise means for receiving the information concerning the characteristic change in the data transmission.

In the eighth aspect of the invention, the data receiver may further comprise means for transmitting information concerning a characteristic change in the data transmission of the data transmitter, and the data transmission controller may further comprise means for receiving the information concerning the characteristic change in the data transmission.

According to a ninth aspect of the invention, there is provided a data transmission system comprising a data transmitter, a data receiver, a data transmission medium for transmitting data from the data transmitter to the data receiver, and a data transmission controller for controlling transmission of the data, wherein the data transmitter comprises means for generating characteristic information of data transmission from the data transmitter to the data receiver before execution of the data transmission; and means for transmitting the characteristic information of the data transmission; the data transmission controller comprises means for receiving the characteristic information of the data transmission; means for storing current bandwidth use conditions of the data transmission medium; means for determining a detailed form of the data transmission based on the current bandwidth use conditions and the characteristic information of data transmission; and means for transmitting information concerning the detailed form of the data transmission; and the data transmitter further comprises means for receiving the information concerning the detailed form of the data transmission; and means for causing the data transmitter to transmit data based on the information concerning the detailed form of the data transmission.

According to a tenth aspect of the invention, there is provided a data transmission system comprising a data transmitter, a data receiver, a data transmission medium for transmitting data from the data transmitter to the data receiver, and a data transmission controller for controlling transmission of the data, wherein the data transmission controller comprises means for receiving characteristic information of data transmission generated by an application of the data transmitter; means for storing current bandwidth use conditions of the data transmission medium; means for determining a detailed form of the data transmission based on the current bandwidth use conditions and the characteristic information of the data transmission; and means for transmitting information concerning the detailed form of the data transmission; and the data transmitter comprises means for receiving the information concerning the detailed form of the data transmission; and means for causing the data transmitter to transmit data based on the information concerning the detailed form of the data transmission.

In the tenth aspect of the invention, the data transmission controller may further comprise means for transmitting the information concerning the detailed form of the data transmission to the application.

In the tenth aspect of the invention, the data transmission system may comprise a plurality of data receivers.

According to an eleventh aspect of the invention, there is provided a method for transmitting data from a data transmitter to a data receiver via a data transmission medium, comprising the steps of generating characteristic information of data transmission from the data transmitter to the data receiver before execution of the data transmission; storing current bandwidth use conditions of the data transmission medium; determining a detailed form of the data transmission based on the current bandwidth use conditions and the characteristic information of the data transmission; and transmitting data from the data transmitter in accordance with the detailed form of the data transmission.

According to a twelfth aspect of the invention, there is provided a computer program product for controlling a computer system, comprising a storage medium that can be read by input means of the computer system; and a program stored on the storage medium, for causing the computer system to execute data transmission from a data transmitter to a data receiver via a data transmission medium, the program causing the computer system to execute the steps of generating characteristic information of data transmission from the data transmitter to the data receiver before execution of the data transmission; storing current bandwidth use conditions of the data transmission medium; determining a detailed form of the data transmission based on the current bandwidth use conditions and the characteristic information of the data transmission; and causing the data transmitter to transmit data in accordance with the detailed form of the data transmission.

According to a thirteenth aspect of the invention, there is provided a computer program product for controlling a computer system, comprising a storage medium that can be read by input means of the computer system; and a program stored on the storage medium, for causing the computer system to execute data transmission from a data transmitter to a data receiver via a data transmission medium, the program causing the computer system to execute the steps of determining a detailed form of data transmission from the data transmitter to the data receiver based on characteristic information concerning the data transmission and current bandwidth use conditions of the data transmission medium before execution of the data transmission; and informing the data transmitter of the detailed form of the data transmission.

According to a fourteenth aspect of the invention, there is provided a computer program product for controlling a computer system, comprising a storage medium that can be read by input means of the computer system; and a program stored on the storage medium, for causing the computer system to execute data transmission from a data transmitter to a data receiver via a data transmission medium, the program causing the computer system to execute the steps of generating current bandwidth use conditions of the data transmission medium and other information necessary to determine a detailed form of the data transmission; transmitting the current bandwidth use conditions and other information to allow determination of the detailed form of the data transmission; receiving a notification of the detailed form of the data transmission; and transmitting data in accordance with the detailed form of the data transmission.

DESCRIPTION OF THE PREFERRED EMBODIMENTS

Embodiments of the present invention will be hereinafter described with reference to the accompanying drawings.

The idea for solving the problems in the invention is to previously know (define) the use conditions of the transmission bandwidth about all data transmission attempts sharing the transmission medium bandwidth and execute bandwidth allocation based on the whole bandwidth use conditions in a unified manner. That is, means having the following functions need to be added to the conventional data transmission configuration:

1. Function of acquiring the bandwidth use conditions of data transmission attempts sharing the transmission medium bandwidth based on application control information.

2. Function of collecting the bandwidth use conditions at one place, controlling the data transmission attempts in a unified manner based on the whole information, and executing proper bandwidth allocation.

Figure 6:
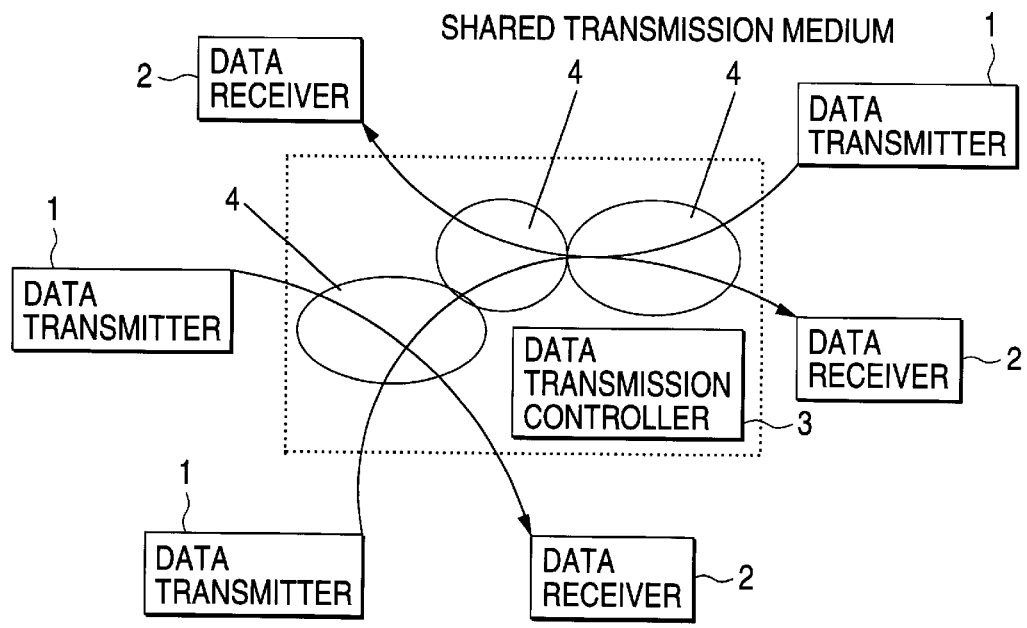
FIG. 6 is an illustration to explain a data transmission environment to which the invention is applied.

As shown in FIG. 6, components include data transmitters 1 serving as data transmission stations in data transmission, data receivers 2 serving as data reception stations, and a data transmission controller 3 for performing unified control of data transmission.

One or more data transmitters 1 and one or more data receivers 2 generally exist for a transmission medium 4 shared in a plurality of data transmission attempts. Only one data transmission controller 3 exists for the transmission medium shared in a plurality of data transmission attempts. If only one data receiver 2 exists for the shared transmission medium, it can be used as the data transmission controller 3.

Embodiment 1

Figure 1:
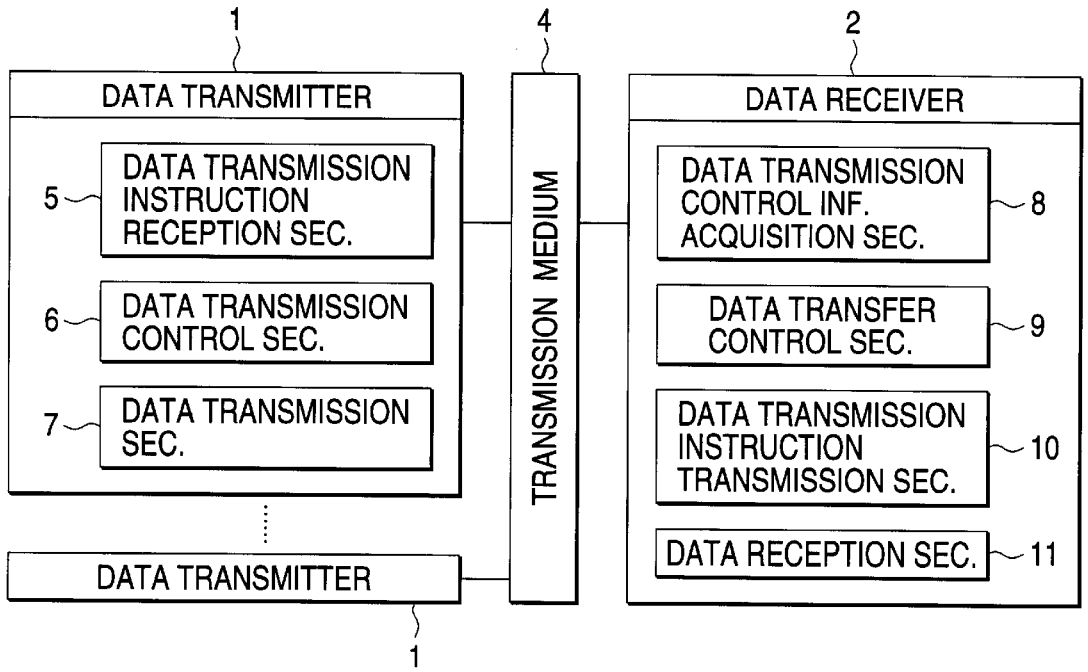
FIG. 1 is a block diagram to show a first embodiment of the invention.
Figure 2:
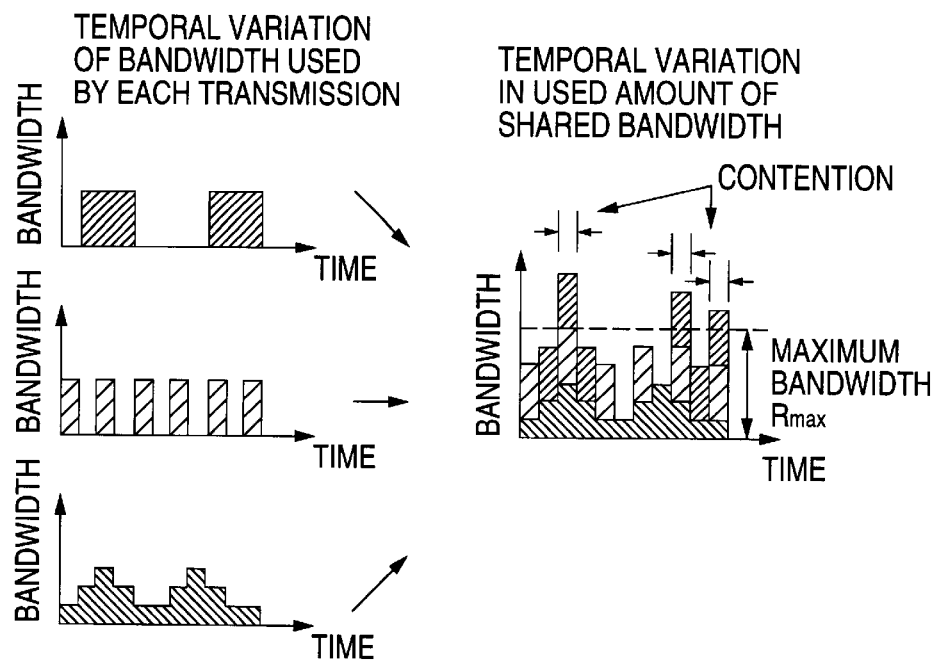
FIG. 2 is an illustration to explain bandwidth contention occurring on conventional transmission media.
Figure 3:
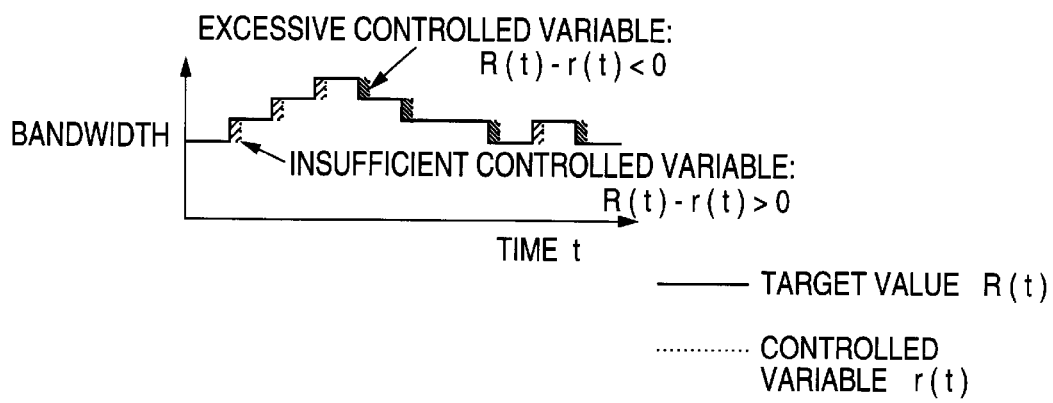
FIG. 3 is an illustration to explain bandwidth contention in conventional packet switching.
Figure 4:
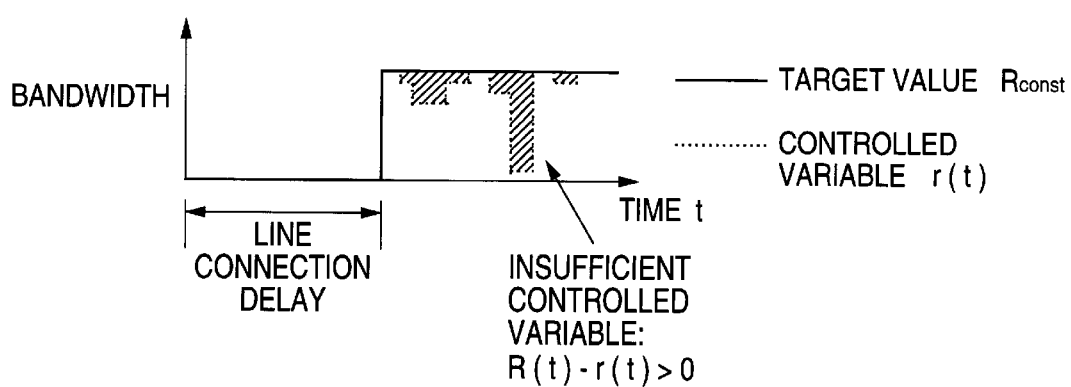
FIG. 4 is an illustration to explain bandwidth contention in conventional circuit switching.
Figure 5:
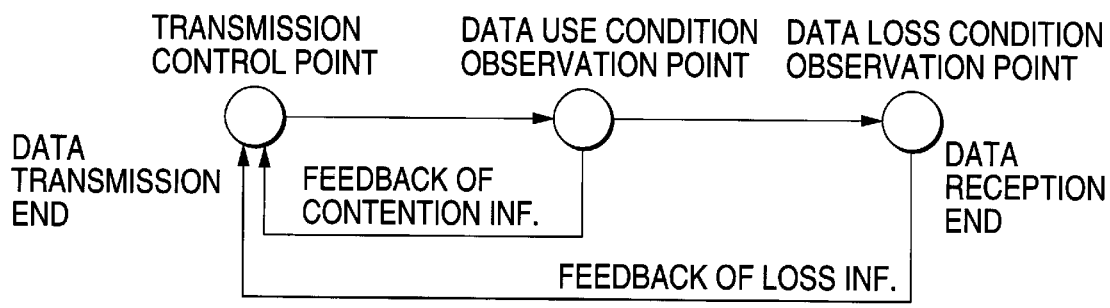
FIG. 5 is an illustration to explain feedback control in conventional packet switching.

FIG. 1 shows a first embodiment of the invention. The first embodiment is a basic form of the invention.

In FIG. 1, the data transmitter 1 transfers data to and from the data receiver 2 via the transmission medium 4 and serves as a data transmission station at the data transmission time. One or more data transmitters 1 exist for the transmission medium 4. The data transmitter 1 has a data transmission instruction reception section 5, a data transmission control section 6, and a data transmission section 7. The data transmission instruction reception section 5 receives data transmission instructions transmitted from the data receiver 2. The data transmission control section 6 controls the start/termination and the bandwidth use amount of data transmission executed by the data transmission section 7 according to the data transmission instructions received by the data transmission instruction reception section 5. The data transmission section 7 transmits data to the data receiver 2.

The data receiver 2 transfers data to and from the data transmitter 1 via the transmission medium 4. At the data transmission time, the data receiver 2 serves as a data reception station and controls a bandwidth contention between data transmission attempts sharing the transmission medium 4. In the embodiment, only one data receiver 2 exists for the shared transmission medium 4.

The data receiver 2 has a data transmission control information acquisition section 8, a data transfer control section 9, a data transmission instruction transmission section 10, and a data reception section 11. The data transmission control information acquisition section 8 acquires data transmission control information for data transmission based on application control information (illustrated later) exchanged between applications before the data transmission is started. It also acquires data transmission control information (illustrated later) indicating request change for the data transmission based on application control information exchanged between applications during/after the data transmission. For example, if data transmission terminates, the data transmission control information acquisition section 8 acquires the data transmission control information indicating the termination of the data transmission.

The data transfer control section 9 determines the detailed form of data transmission, such as the point in time at which data transmission of the contents indicated in the data transmission control information is enabled and the transmission bandwidth that can be used for the data transmission, based on the data transmission control information obtained by the data transmission control information acquisition section 8 and the bandwidth use conditions of the current data transmission being executed, and uses the data transmission instruction transmission section 10 to transmit transmission instructions indicating the contents to the data transmitter 1. A configuration example of the data transfer control section 9 will be discussed in detail later with reference to FIG. 10.

The data transmission instruction transmission section 10 transmits data transmission instructions to the data transmitter 1. The data reception section 11 receives data transmitted from the data transmitter 1.

The transmission medium 4 may be any medium, such as a circuit switching network or a packet switching network.

The functional portions forming the data transmitter 1, the data receiver 2, the data transmission controller 3 (in the first embodiment, the data receiver 2 also serves as the data transmission controller 3), etc., may be made of hardware or software.

Next, specific application information examples as sources of the data transmission control information are shown below:

1. In a standard file transfer protocol ftp, when data transmission is started, a notification of the data amount of the file to be transferred is sent from the data transmission end to the data reception end.

2. A control file used by a print spooler of a UNIX operating system contains information such as the number of data files transmitted between printer spools for printing and the data amount of each file.

3. Specification of ISO 10175: DPA (Document Printing Application), print job details such as the data amount, the number of pages, the data amount and format for each page, the number of output copies, and the output time limit of the document to be printed out can be indicated in the contents of print request information transmitted from a client to a print server at the print-out time.

Next, for example, the following information entries are contained in the data transmission control information:
1. Data Transmitter Identifier
   Generally indicates the data transmission station name.
2. Data Transmission Identifier
   Generally, a single data transmission station may execute a plurality of data transmission attempts at the same time. At the time, the data transmission identifier identifies which data transmission the data transmission information relates to.
3. Certification of Validity of Data Transmission Information
   Certifies that the data transmission information is valid.
4. Data Transmission Route
   Generally indicates a mere data reception station name. Precisely, it indicates the identifier of the data transmission route to the data reception station or the identifier of the transmission medium used on the route.
5. Transmission Data Amount
   Indicates the amount of data transmitted during one data transmission. To indicate the termination of the data transmission, for example, the transmission data amount is set to 0.
6. Data Transmission Start Period
   Indicates the top time and end time of the period in which the data transmission can be started.
7. Data Transmission Termination Period
   Indicates the top time and end time of the period in which the data transmission should be terminated.
8. Request Range of Use Transmission Bandwidth
   Indicates the range of a use bandwidth requested for the data transmission.
9. Control Range of Use Transmission Bandwidth
   Indicates the range of a use bandwidth that can be manipulated at the data transmission station.
10. Priority of Data Transmission Bandwidth Allocation
    Is used when order or priority specification among data transmission attempts is enabled.

These information entries other than 1. Data transmitter identifier may not be explicit in the data transmission information depending on the embodied configuration.

When data transmission instructions are determined based on the data transmission control information prepared by an application and the application is notified of the result as shown in fifth and tenth embodiments discussed later, if any of the above-mentioned conditions in the data transmission control information is not satisfied, the application is notified of data transmission instructions indicating that the transmission request of the contents shown in the transmission control information cannot be accepted. In this case, no data transmission instruction is sent to the target transmitter. If any of the transmission conditions requested by the application is not satisfied, the notified application can cancel those transmission conditions and make another transmission request by specifying different timing and transmission conditions, based on the data transmission instructions.

In any case other than where an application prepares data transmission control information and is notified of the determination result of data transmission instructions based on the data transmission control information as shown in fifth and tenth embodiments discussed later, if any of the above-mentioned conditions shown in the data transmission control information is not satisfied, the conditions are ignored.

Next, the following pieces of information are explicitly described in the transmission instructions:
1. Data Transmission Start Period
   Indicates the head time and end time of the period in which the data transmission should be started. To simply give an immediate transmission start instruction, for example, (head time)=present and (end time)=present or undefined are specified. If the transmission request of the contents shown in the transmission control information cannot be accepted, for example, (head time)=undefined or infinity is set.
2. Data Transmission Identifier
   Identifies which data transmission the transmission instructions are applied to.
3. Data Transmission Termination (Stop) Period
   Indicates the head time and end time of the period in which the data transmission should be terminated (stopped). To simply specify the transmission termination (stop) time limit, for example, (head time)=present or undefined and (end time)=(transmission termination (stop) time limit) are specified. To simply give an immediate transmission stop instruction, for example, (head time)=present or undefined and (end time)=present are specified.
4. Data Transmission Route
   Indicates the route or transmission medium to be used for data transmission or simply specifies the target reception terminal.
5. Transmission Data Amount
   Indicates the range of the amount of data whose transmission is allowed by one set of transmission instructions.
6. Use Transmission Bandwidth
   Indicates the use bandwidth range.

These information entries other than 1. Data transmission start period may not be explicit in the transmission instructions depending on the embodied configuration. For example, to apply the invention to Ethernet, 6. Use transmission bandwidth is insignificant.

Next, the operation of the first embodiment will be discussed.

Figure 7:
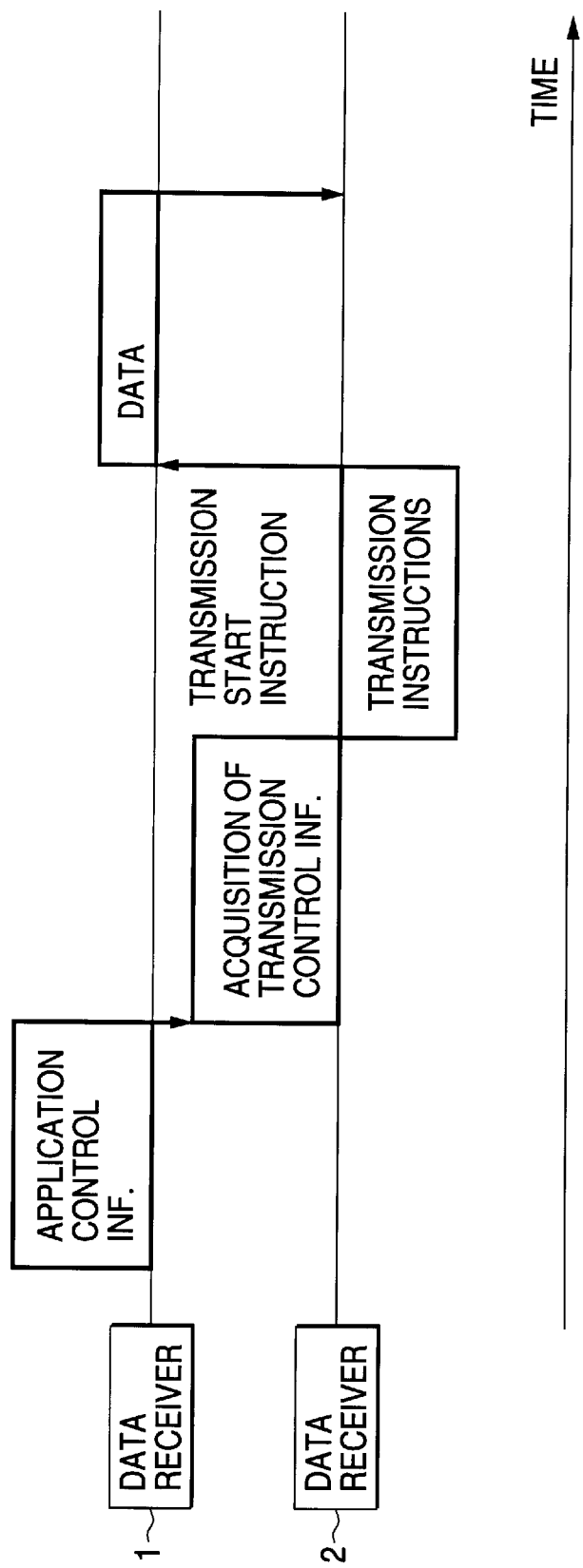
FIG. 7 is a diagram to explain the operation of the first embodiment of the invention.

FIG. 7 shows an outline of the operation, wherein the following steps are executed:

1. The data transmitter 1 transmits application control information to the data receiver 2 before data transmission is started by an application.

2. The data receiver 2 acquires data transmission control information for the data transmission based on the received application control information, then determines the point in time at which the data transmission of the contents of the data transmission control information will be enabled and the transmission bandwidth that can be used for the data transmission and returns transmission instructions indicating the determination to the data transmitter 1.

3. Upon reception of the transmission instructions from the data receiver 2, the data transmitter 1 executes data transmission in accordance with the instruction contents.

Figure 8:
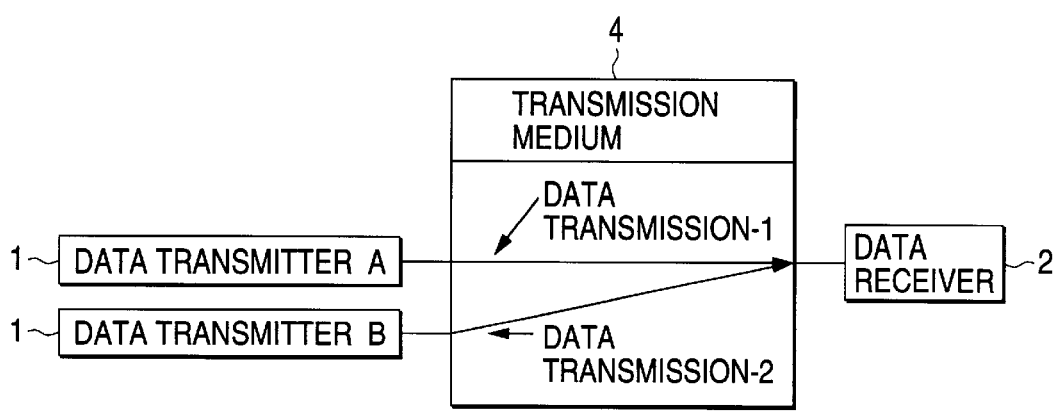
FIG. 8 is a diagram to explain the operation of the first embodiment of the invention.
Figure 9:
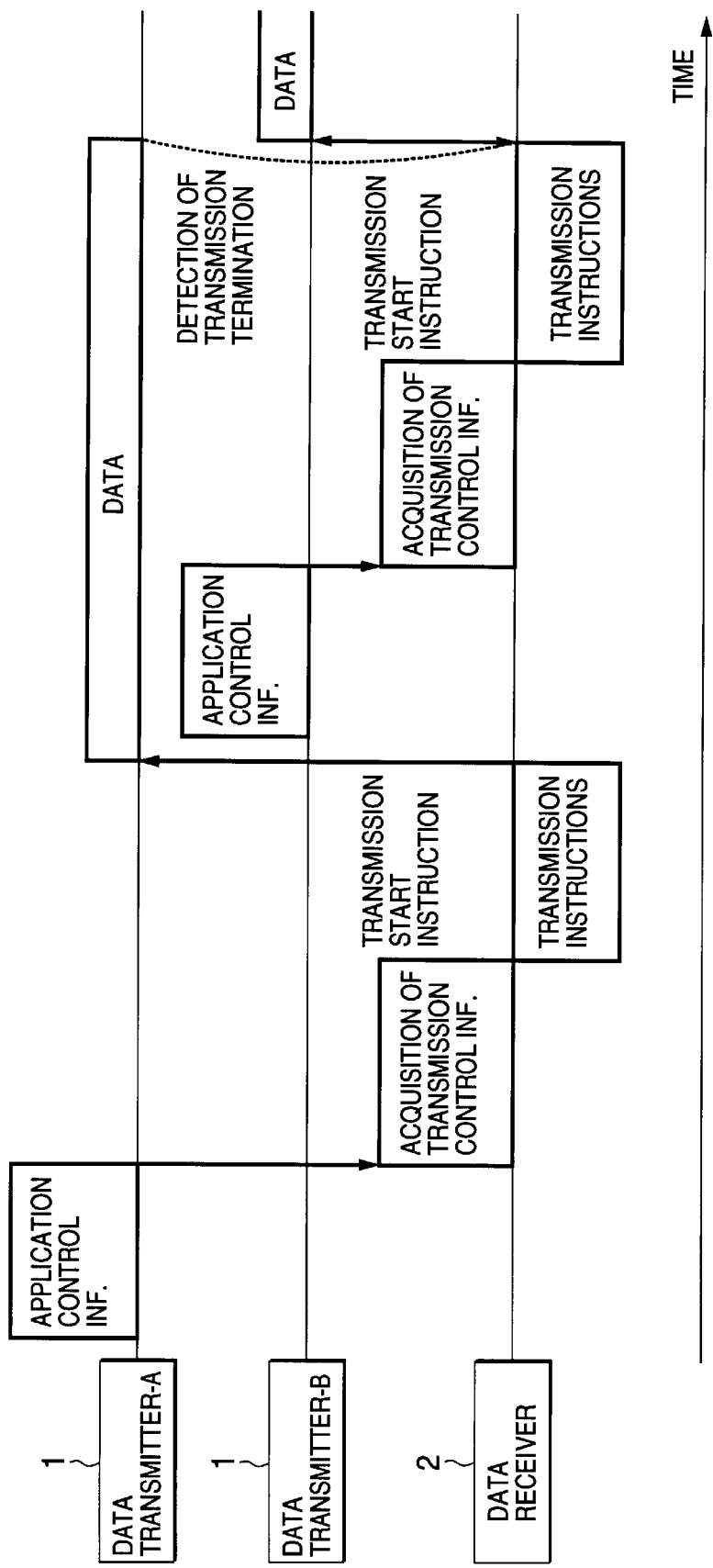
FIG. 9 is a diagram to explain the operation of the first embodiment of the invention.

When the above operation is executed for a plurality of data transmission attempts, a plurality of data transmission operations are effected as shown in FIG. 8. In this case, the bandwidth allocation is controlled as shown in FIG. 9.

The data transfer control section 9 determines instructions for each data transmission based on the transmission request shown in the data transmission information, the bandwidth use conditions of the current transmission being executed, and the transmission capability of each transmission medium used for the current transmission being executed.

Figure 10:
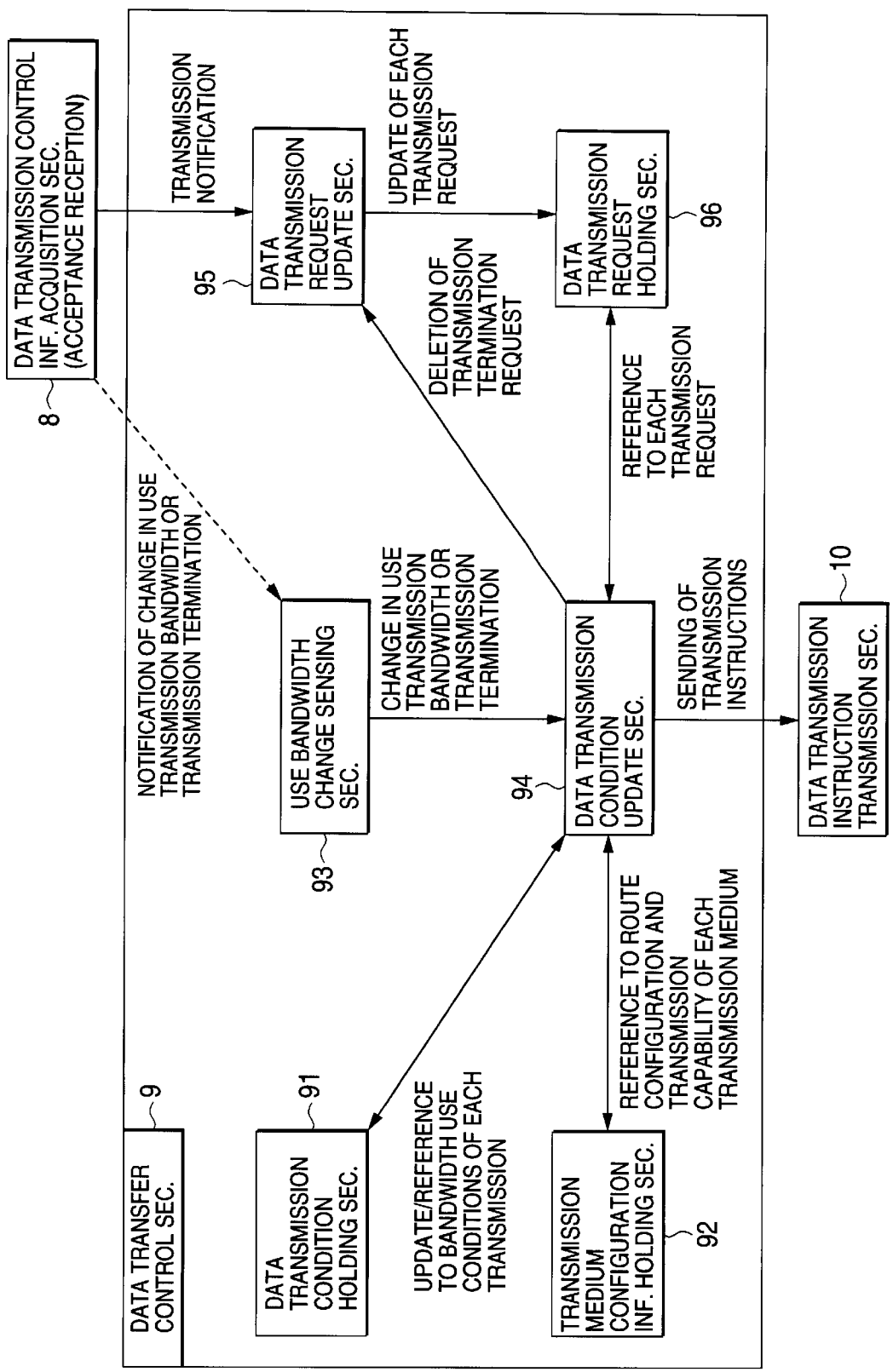
FIG. 10 is a block diagram to show a configuration example of a data transfer control section 9 of the first embodiment.
Figure 11:
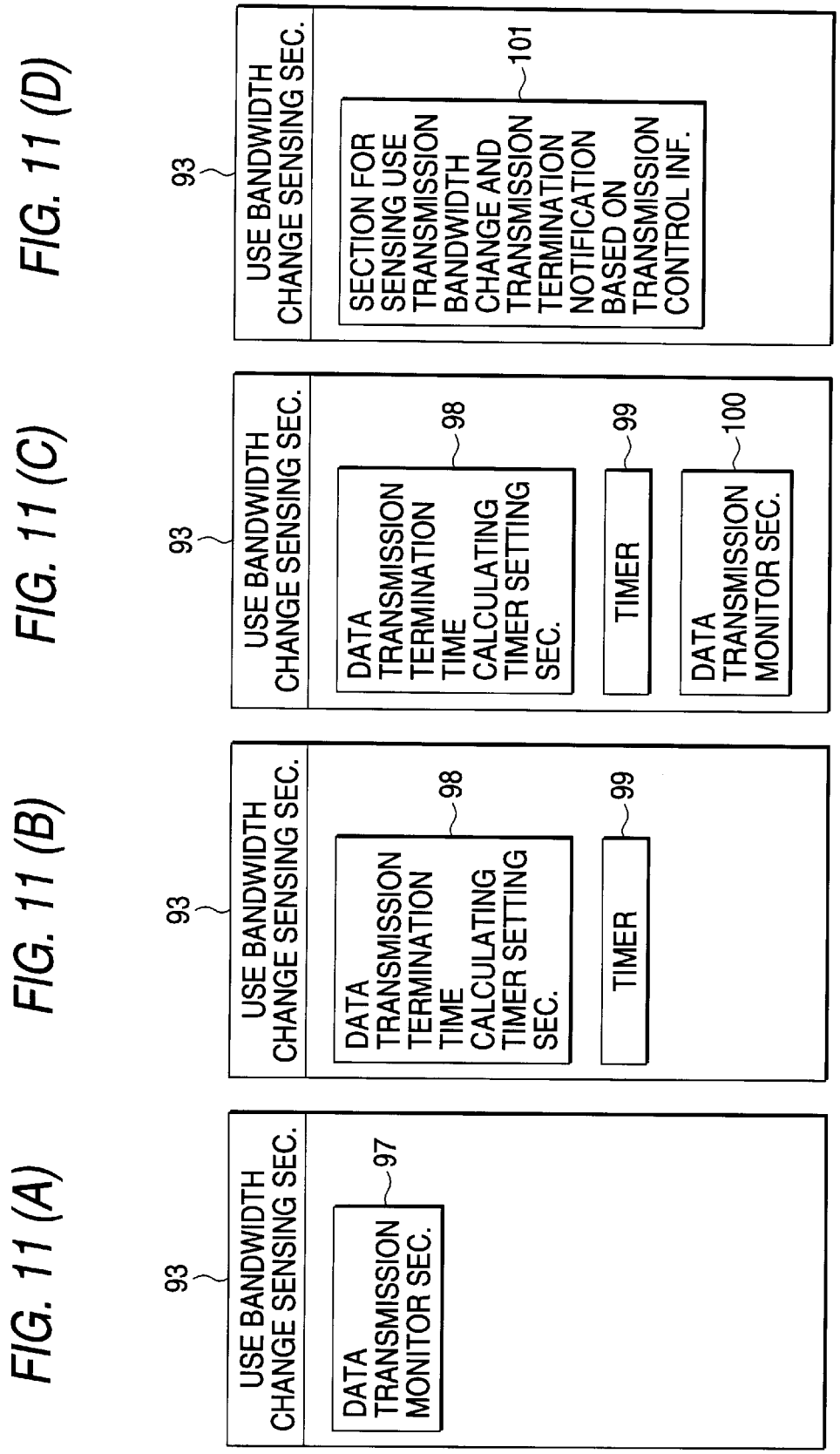
FIGS. 11(A)–11(D) are diagrams to show configuration examples of a use bandwidth change sensing section 93 of the data transfer control section 9 in FIG. 10.

FIG. 10 shows the detailed configuration of the data transfer control section 9. When sensing use bandwidth change of the current data transmission being executed, particularly, the transmission termination, the data transfer control section 9 determines whether or not data transmission waiting for execution at present can be started and whether or not the instruction for the current data transmission being executed needs to be changed, and for the data transmission that can be started or for which the instruction is changed, sends data transmission instructions to the corresponding data transmitter 1.

In FIG. 10, the data transfer control section 9 consists of a data transmission condition holding section 91, a transmission medium configuration information holding section 92, a use bandwidth change sensing section 93, a data transmission condition update section 94, a data transmission request update section 95, and a data transmission request holding section 96. The data transmission condition update section 94 generates data transmission instructions based on the data held in the data transmission condition holding section 91, the transmission medium configuration information holding section 92, and the data transmission request holding section 96, and sends the data transmission instructions to the data transmitter 1 through the data transmission instruction transmission section 10.

Figure 22:
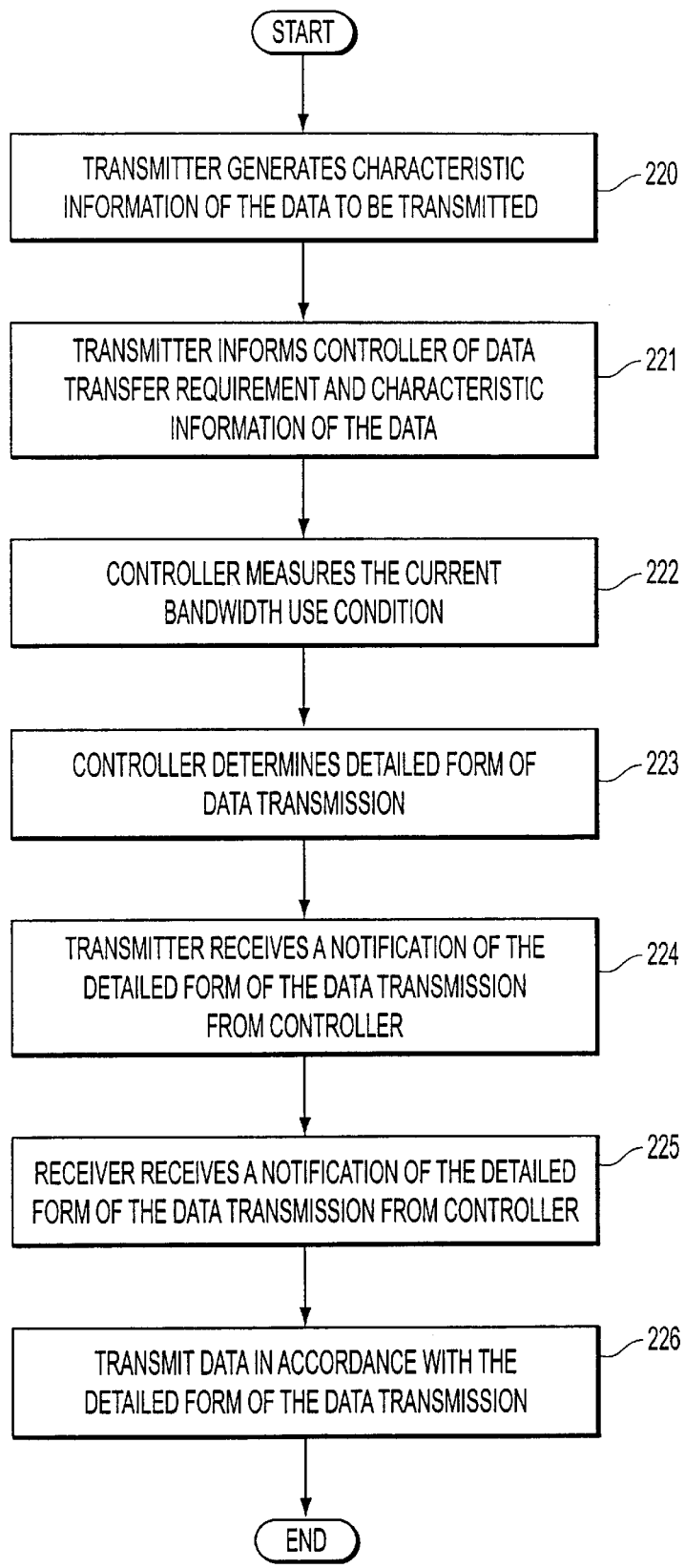
FIG. 22 is a flowchart outlining an exemplary operation of the invention.

FIG. 22 shows a flowchart outlining an exemplary operation of the invention. As shown in FIG. 22, in step 220 the data transmitter 1 generates characteristic information of the data to be transmitted. The characteristic information may include the amount of data and application control information e.g. the type of data for a particular application.

In step 221, the data transmitter 1 informs the data transmission controller 3 that data needs to be transmitted and provides the characteristic information of the data as well as the transmitter identification.

Next, in step 222, the data transmission controller 3 measures the current bandwidth use conditions of the transmission medium 4, and goes to step 223. In step 223, the data transmission controller 3 determines the detailed form of the data transmission including the data transmission start time and the transmission bandwidth allotted to the data to be transmitted.

In step 224, the data transmission controller 3 notifies the identified data transmitter 1 of the detailed form of the data transmission and goes to step 225. In step 225, the data transmission controller 3 notifies the data receiver 2 of the detailed form of the data transmission. Finally, in step 226, the data transmitter 1 transmits to the data receiver 2 the data in accordance with the detailed form of the data transmission.

FIGS. 11(A)–11(D) show configuration examples of the use bandwidth change sensing section for sensing the termination of the current data transmission being executed (bandwidth use amount change).

1. Sensing by Monitoring Data Transmission (FIG. 11(A))

This configuration example uses a data transmission monitor section 97 for monitoring the data transmission conditions in the transmission medium used on the route of the current data transmission being executed or in the reception station to which data is transmitted by the data transmission and sensing the termination of the data transmission. The example is furthermore classified into the following according to the termination determination method:

1-1. Sensing Based on Change in Bandwidth Use Conditions of Data Transmission

When a certain time has elapsed since data transmission stopped bandwidth use, the data transmission is determined to terminate.

1-2. Sensing Based on Transmitted Data Contents

A code indicating the end of data is suffixed to the data to be transmitted and when the code is sensed, the data transmission is determined to terminate.

2. Sensing with Timer (FIG. 11(B))

If the transmission data amount is previously known and the bandwidth use amount can be specified, the time required for data transmission can be calculated. In this case, when a data transmission start instruction is given, the data transmission termination time is found and a timer is set. This example uses a data transmission termination time calculation/timer setting section 98 and a timer 99 are used.

3. Sensing Both with a Timer and by Monitoring Data Transmission (FIG. 11(C))

If the transmission data amount is previously known and the bandwidth use amount can be specified, the data transmission termination time is predicted and a timer is set to the time. When a certain time has elapsed since the data transmission stopped bandwidth use after the timer expired and the termination schedule time of the data transmission was reached, the data transmission is determined to terminate. This example uses a data transmission termination time calculation/timer setting section 98, a timer 99, and a data transmission monitor section 100 are used.

4. Sensing According to Transmission Control Information Indicating Data Transmission Termination or Decrease in Request Value of Use Transmission Bandwidth (FIG. 11(D))

This example uses a use transmission bandwidth change/transmission termination notification sensing section according to transmission control information 101. If the transmission control information indicating the data termination, for example, transmission amount=0 is detected, the data transmission is determined to terminate. If the transmission control information indicating update of the use transmission bandwidth request range in a direction of decreasing the request bandwidth is detected, it is determined that the use bandwidth of the data transmission has decreased to the range.

Embodiment 2

A second embodiment of the invention will be discussed with reference to FIG. 12. The second embodiment is adapted to use a transmitter for notifying change in data transmission control information. Parts identical with or similar to those of the first embodiment will not be discussed again.

Figure 12:
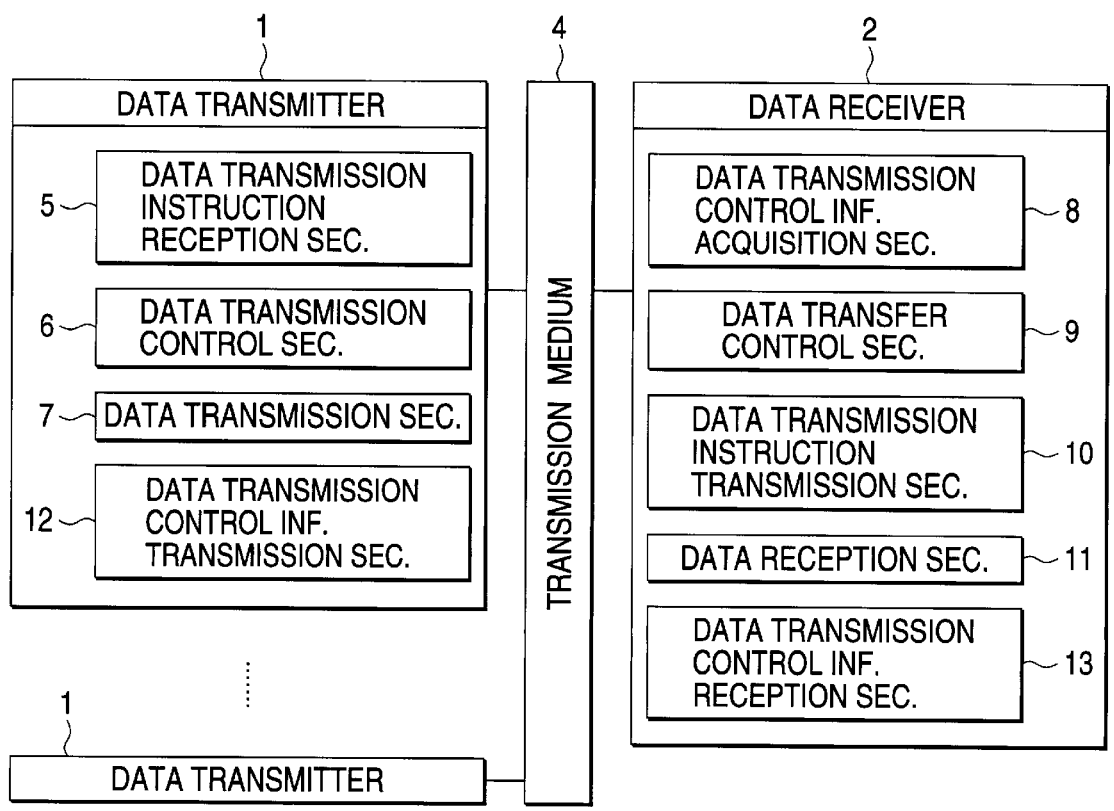
FIG. 12 is a block diagram to show a second embodiment of the invention.

FIG. 12 shows the configuration of the second embodiment of the invention.

1. Data Transmitter 1

1-1. Data Transmission Instruction Reception Section 5 (Same as That of the First Embodiment)

1-2. Data Transmission Control Section 6

A data transmission control section 6 controls the start/termination and bandwidth use amount of data transmission executed by a data transmission section 7 in accordance with data transmission instructions received by the data transmission instruction reception section 5. If a request for data transmission changes, for example, the data transmission terminates, the data transmission control section 6 uses a data transmission control information transmission section 12 to transmit data transmission control information indicating the termination of the data transmission to a data receiver 2.

1-3. Data Transmission Section 7 (Same as That of the First Embodiment)

1-4. Data Transmission Control Information Transmission Section 12

If a request for data transmission changes, the data transmission control information transmission section 12 transmits data transmission control information to the data receiver 2.

2. Data Receiver 2

2-1. Data Transmission Control Information Acquisition Section 8 (Same as That of the First Embodiment)

2-2. Data Transfer Control Section 9

A data transfer control section 9 determines the point in time at which the data transmission of the contents of data transmission control information will be enabled and the transmission bandwidth that can be used for the data transmission based on the data transmission control information obtained by the data transmission control information acquisition section 8 and a data transmission control information reception section 13 and the bandwidth use conditions of the current data transmission being executed, and uses a data transmission instruction transmission section 10 to return transmission instructions indicating the determination to the associated data transmitter 1.

2-3. Data Transmission Instruction Transmission Section 10 (Same as That of the First Embodiment)

2-4. Data Reception Section 11 (Same as That of the First Embodiment)

2-5. Data Transmission Control Information Reception Section 13

Receives data transmission control information transmitted from a data transmitter 1.

Embodiment 3

A third embodiment of the invention will be discussed with reference to FIG. 13. The third embodiment is adapted to use a data transmitter to get data transmission control information. Parts identical with or similar to those of the first embodiment will not be discussed again.

Figure 13:
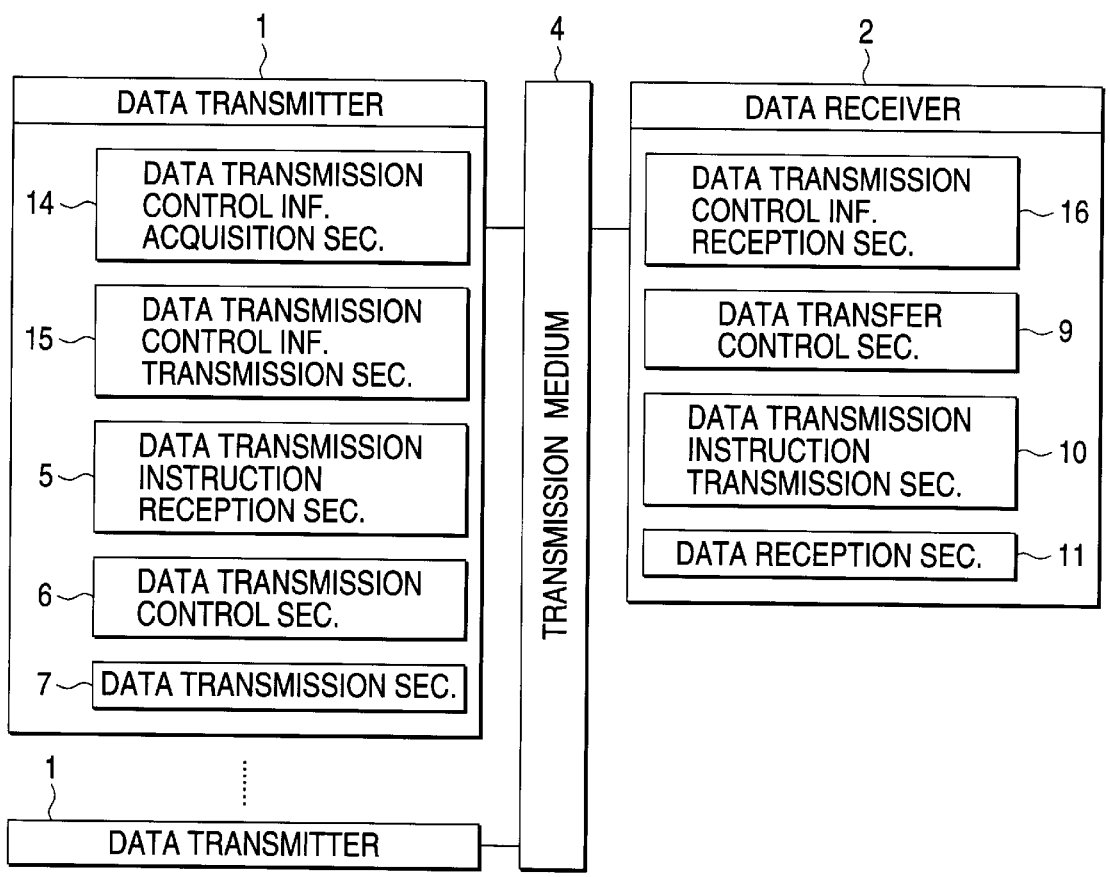
FIG. 13 is a block diagram to show a third embodiment of the invention.

FIG. 13 shows the configuration of the third embodiment of the invention.

1. Data Transmitter 1

1-1. Data Transmission Control Information Acquisition Section 14

Acquires data transmission control information for data transmission based on application control information exchanged between applications before the data transmission is started.

1-2. Data Transmission Control Information Transmission Section 15

Transmits the data transmission control information obtained by the data transmission control information acquisition section 14 to a data receiver 2.

1-3. Data Transmission Instruction Reception Section 5 (Same as That of the First Embodiment)

1-4. Data Transmission Control Section 6 (Same as That of the First Embodiment)

1-5. Data Transmission Section 7 (Same as That of the First Embodiment)

2. Data Receiver 2

2-1. Data Transmission Control Information Acquisition Section 8 (Deleted From the First Embodiment)

2-2. Data Transmission Control Information Reception Section 16

Receives data transmission control information transmitted from a data transmitter 1.

2-3. Data Transfer Control Section 9

A data transfer control section 9 determines the point in time at which the data transmission of the contents of data transmission control information will be enabled and the transmission bandwidth that can be used for the data transmission based on the data transmission control information received by the data transmission control information reception section 16 and the bandwidth use conditions of the current data transmission being executed, and uses a data transmission instruction transmission section 10 to return transmission instructions indicating the determination to the associated data transmitter 1.

2-4. Data Transmission Instruction Transmission Section 10 (Same as That of the First Embodiment)

2-5. Data Reception Section 11 (Same as That of the First Embodiment)

Embodiment 4

A fourth embodiment of the invention will be discussed with reference to FIG. 14. In the fourth embodiment, an application prepares data transmission control information. Parts identical with or similar to those of the first embodiment will not be discussed again.

Figure 14:
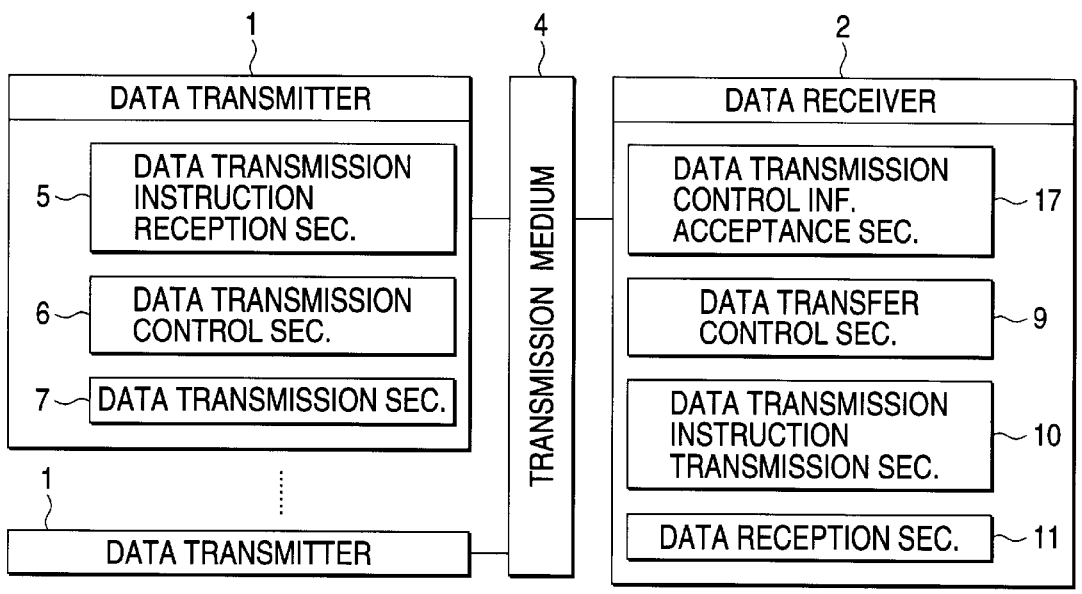
FIG. 14 is a block diagram to show a fourth embodiment of the invention.

FIG. 14 shows the configuration of the fourth embodiment of the invention.

1. Data Transmitter 1

1-1. Data Transmission Instruction Reception Section 5 (Same as That of the First Embodiment)

1-2. Data Transmission Control Section 6 (Same as That of the First Embodiment)

1-3. Data Transmission Section 7 (Same as That of the First Embodiment)

2. Data Receiver 2

2-1. Data Transmission Control Information Acquisition Section 8 (Deleted from the First Embodiment)

2-2. Data Transmission Control Information Acceptance Section 17

Accepts data transmission control information prepared explicitly by an application.

2-3. Data Transfer Control Section 9

A data transfer control section 9 determines the point in time at which the data transmission of the contents of data transmission control information will be enabled and the transmission bandwidth that can be used for the data transmission based on the data transmission control information accepted by the data transmission control information acceptance section 17 and the bandwidth use conditions of the current data transmission being executed, and uses a data transmission instruction transmission section 10 to return transmission instructions indicating the determination to the associated data transmitter 1.

2-4. Data Transmission Instruction Transmission Section 10 (Same as That of the First Embodiment)

2-5. Data Reception Section 11 (Same as That of the First Embodiment)

Embodiment 5

A fifth embodiment of the invention will be discussed with reference to FIG. 15. In the fifth embodiment, an application prepares data transmission control information and is notified of the data transmission instruction determination result based on the prepared data transmission control information. Parts identical with or similar to those of the first embodiment will not be discussed again.

Figure 15:
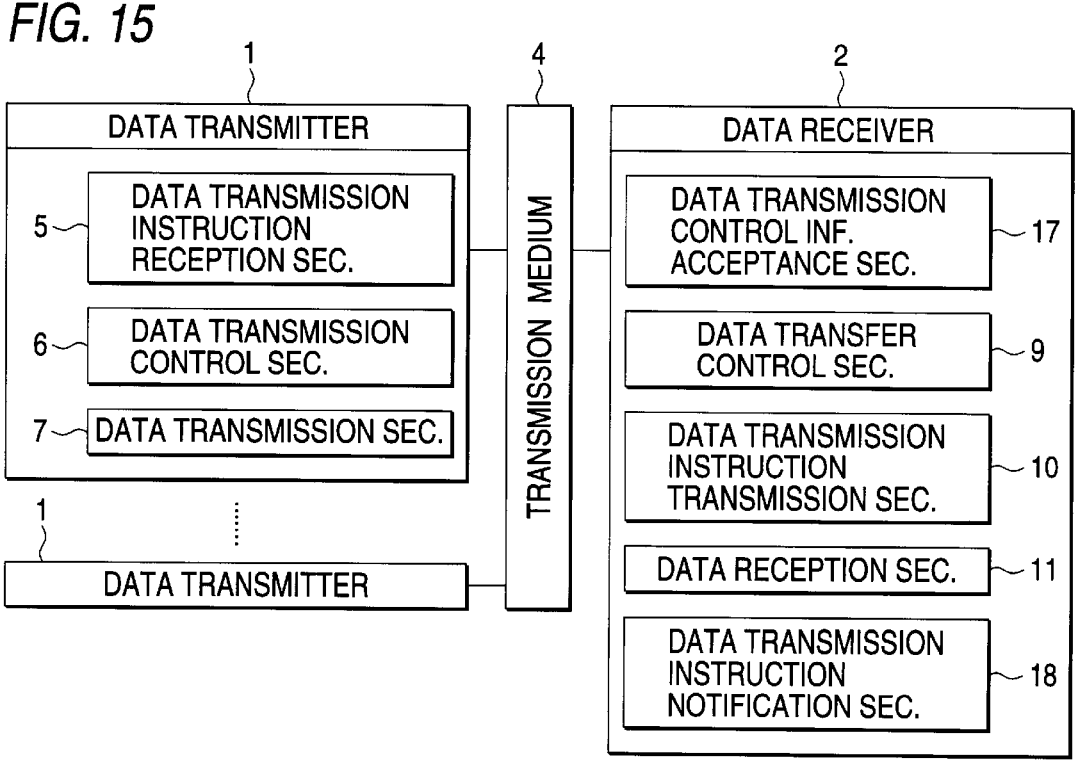
FIG. 15 is a block diagram to show a fifth embodiment of the invention.

FIG. 15 shows the configuration of the fifth embodiment of the invention.

1. Data Transmitter 1

1-1. Data Transmission Instruction Reception Section 5 (Same as That of the First Embodiment)

1-2. Data Transmission Control Section 6 (Same as That of the First Embodiment)

1-3. Data Transmission Section 7 (Same as That of the First Embodiment)

2. Data Receiver 2

2-1. Data Transmission Control Information Acquisition Section 8 (Deleted From the First Embodiment)

2-2. Data Transmission Control Information Acceptance Section 17

Accepts data transmission control information prepared explicitly by an application.

2-3. Data Transfer Control Section 9

A data transfer control section 9 determines the point in time at which the data transmission of the contents of data transmission control information will be enabled and the transmission bandwidth that can be used for the data transmission based on the data transmission control information accepted by the data transmission control information acceptance section 17 and the bandwidth use conditions of the current data transmission being executed, and uses a data transmission instruction transmission section 10 to return transmission instructions indicating the determination to the associated data transmitter 1.

2-4. Data Transmission Instruction Transmission Section 10 (Same as That of the First Embodiment)

2-5. Data Transmission Instruction Notification Section 18

Sends a notification of the data transmission instruction determination result based on the data transmission control information prepared by a data transmission control application to the application.

2-6. Data Reception Section 11 (Same as That of the First Embodiment)

Embodiment 6

A sixth embodiment of the invention will be discussed with reference to FIG. 16. The sixth embodiment includes a plurality of data receivers. Parts identical with or similar to those of the first embodiment will not be discussed again.

Figure 16:
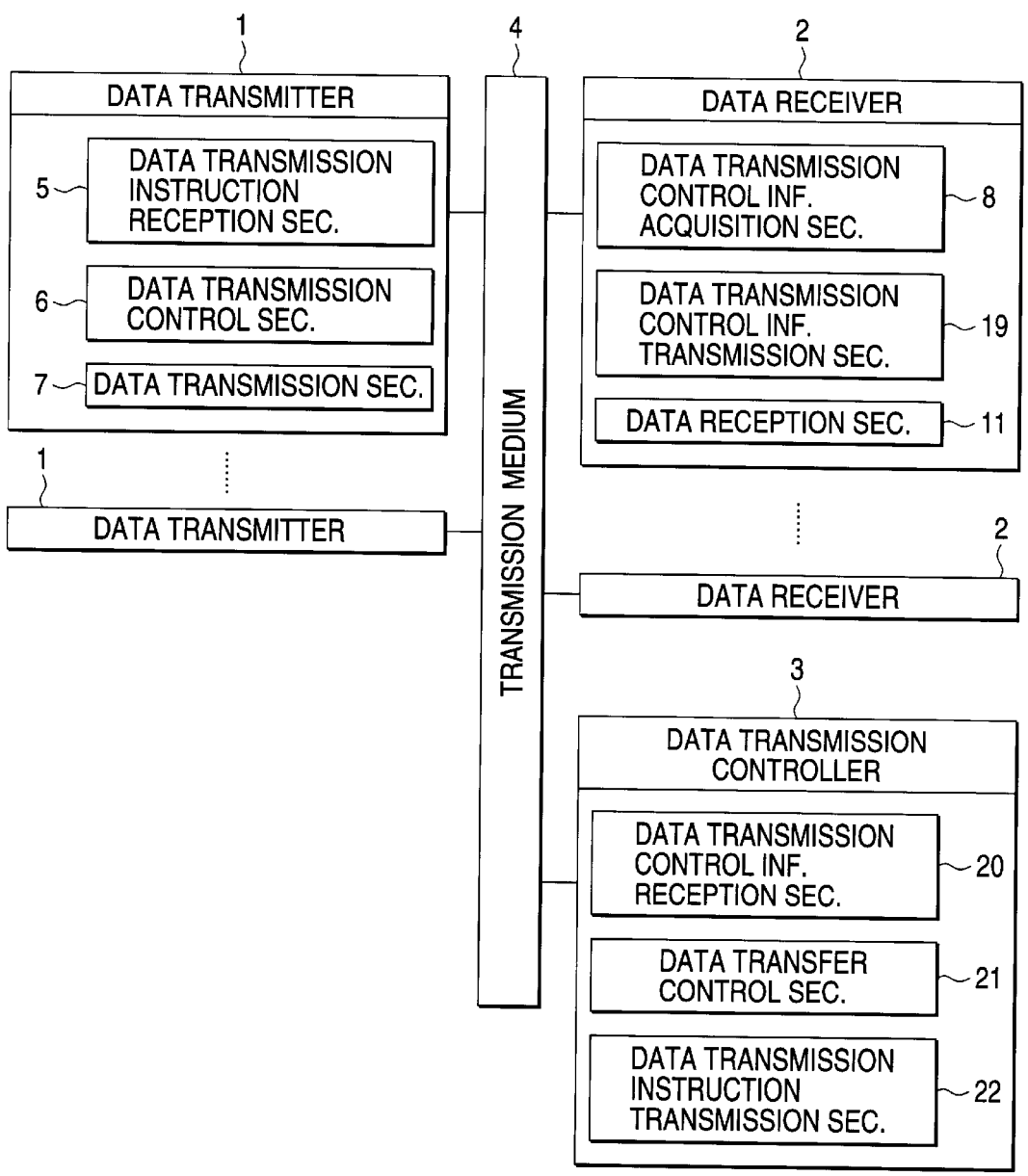
FIG. 16 is a block diagram to show a sixth embodiment of the invention.

FIG. 16 shows the configuration of the sixth embodiment of the invention.

1. Data Transmitter 1

1-1. Data Transmission Instruction Reception Section 5

Receives data transmission instructions transmitted from a data transmission controller 3.

1-2. Data Transmission Control Section 6 (Same as That of the First Embodiment)

1-3. Data Transmission Section 7 (Same as That of the First Embodiment)

2. Data Receivers 2

Data receivers share a transmission medium and transfer data to and from the data transmitters and serve as data reception stations at the data transmission time. One or more data receivers exist for a transmission medium.

2-1. Data Transmission Control Information Acquisition Section 8 (Same as That of the First Embodiment)

2-2. Data Transmission Control Information Transmission Section 19

Transmits data transmission control information obtained by the data transmission control information acquisition section 8 to the data transmission controller 3.

2-3. Data Reception Section 11 (Same as That of the First Embodiment)

2-4. Data Transfer Control Section 9 (Deleted From the First Embodiment)

2-5. Data Transmission Instruction Transmission Section 10 (Deleted From the First Embodiment)

3. Data Transmission Controller 3

The data transmission controller 3 controls a bandwidth contention among the data transmission attempts sharing a transmission medium. Only one data transmission controller 3 exists for the shared transmission medium.

3-1. Data Transmission Control Information Reception Section 20

Receives data transmission control information transmitted from a data receiver 2.

3-2. Data Transfer Control Section 21

A data transfer control section 21 determines the point in time at which the data transmission of the contents of data transmission control information will be enabled and the transmission bandwidth that can be used for the data transmission based on the data transmission control information received by the data transmission control information reception section 20 and the bandwidth use conditions of the current data transmission being executed, and uses a data transmission instruction transmission section 22 to return transmission instructions indicating the determination to the associated data transmitter 1. The data transfer control section 21 has a similar configuration to that of the data transfer control section 9 in FIG. 10. However, if the configuration of a use bandwidth change sensing section is FIG. 11(A) or 11(C), the data transmission controller 3 needs to monitor a data flow on the medium.

3—3. Data Transmission Instruction Transmission Section 22

Transmits data transmission instructions to a data transmitter 1.

Embodiment 7

A seventh embodiment of the invention will be discussed with reference to FIG. 17. The seventh embodiment is adapted to use a data transmitter 1 for notifying change in data transmission control information if more than one data receiver exists. Parts identical with or similar to those of the sixth embodiment will not be discussed again.

Figure 17:
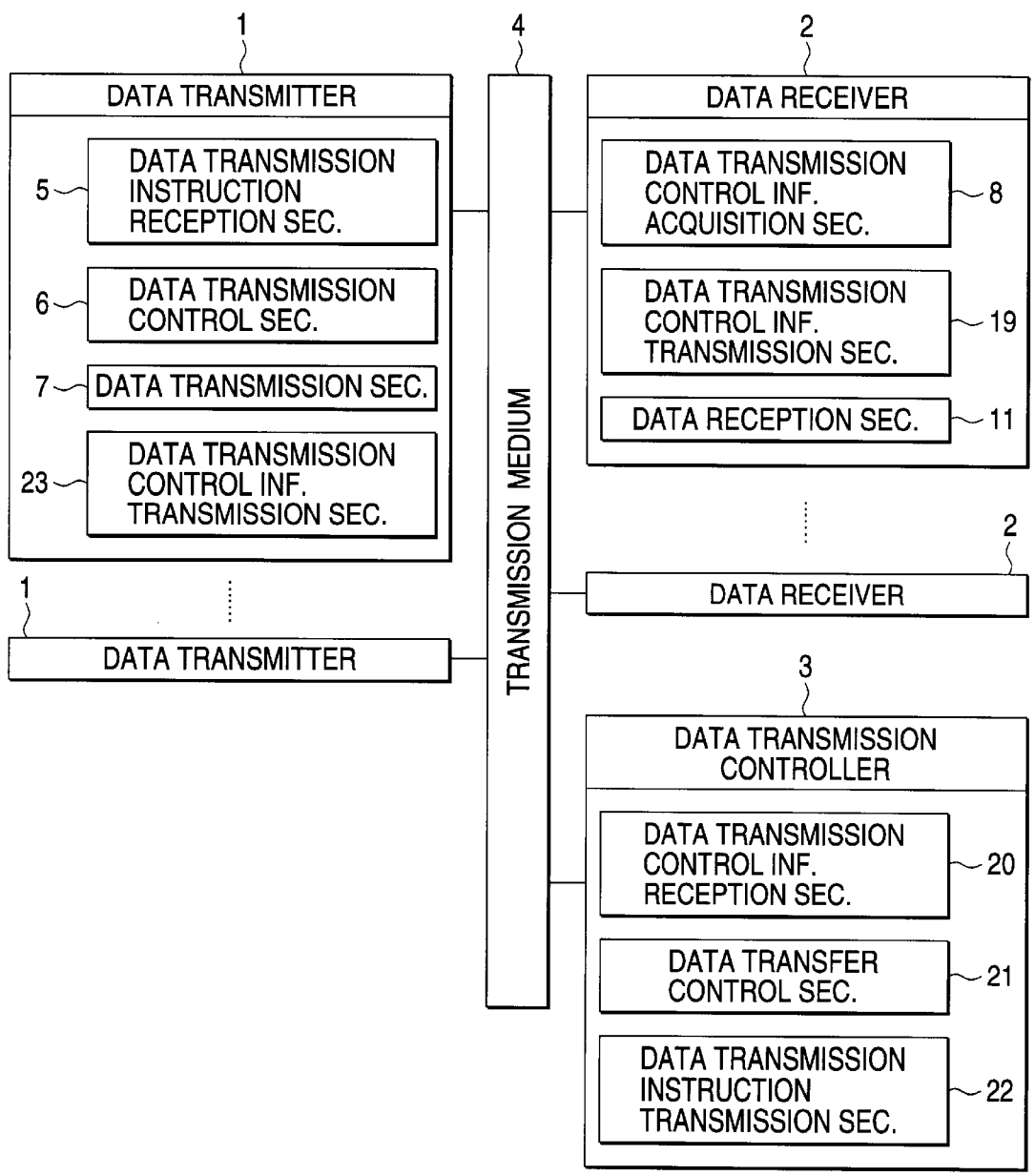
FIG. 17 is a block diagram to show a seventh embodiment of the invention.

FIG. 17 shows the configuration of the seventh embodiment of the invention.

1. Data Transmitter 1

1-1. Data Transmission Instruction Reception Section 5 (Same as That of the Sixth Embodiment)

1-2. Data Transmission Control Section 6

A data transmission control section 6 controls the start/termination and bandwidth use amount of data transmission executed by a data transmission section 7 in accordance with data transmission instructions received by the data transmission instruction reception section 5. If a request for data transmission changes, for example, the data transmission terminates, the data transmission control section 6 uses a data transmission control information transmission section 23 to transmit data transmission control information indicating the termination of the data transmission to a data transmission controller 3.

1-3. Data Transmission Section 7 (Same as That of the Sixth Embodiment)

1-4. Data Transmission Control Information Transmission Section 23

If a request for data transmission changes, the data transmission control information transmission section 12 transmits data transmission control information to the data transmission controller 3.

2. Data Receiver 2

2-1. Data Transmission Control Information Acquisition Section 8 (Same as That of the Sixth Embodiment)

2-2. Data Transmission Control Information Transmission Section 19 (Same as That of the Sixth Embodiment)

2-3. Data Reception Section 11 (Same as That of the Sixth Embodiment)

3. Data Transmission Controller 3

3-1. Data Transmission Control Information Reception Section 20

Receives data transmission control information transmitted from data receivers 2 and data transmitters 1.

3-2. Data Transfer Control Section 21 (Same as That of the Sixth Embodiment)

3-3. Data Transmission Instruction Transmission Section 22 (Same as That of the Sixth Embodiment)

Embodiment 8

An eighth embodiment of the invention will be discussed with reference to FIG. 18. The eighth embodiment is adapted to use a data receiver 2 for notifying change in data transmission control information if more than one data receiver 2 exists. Parts identical with or similar to those of the sixth embodiment will not be discussed again.

Figure 18:
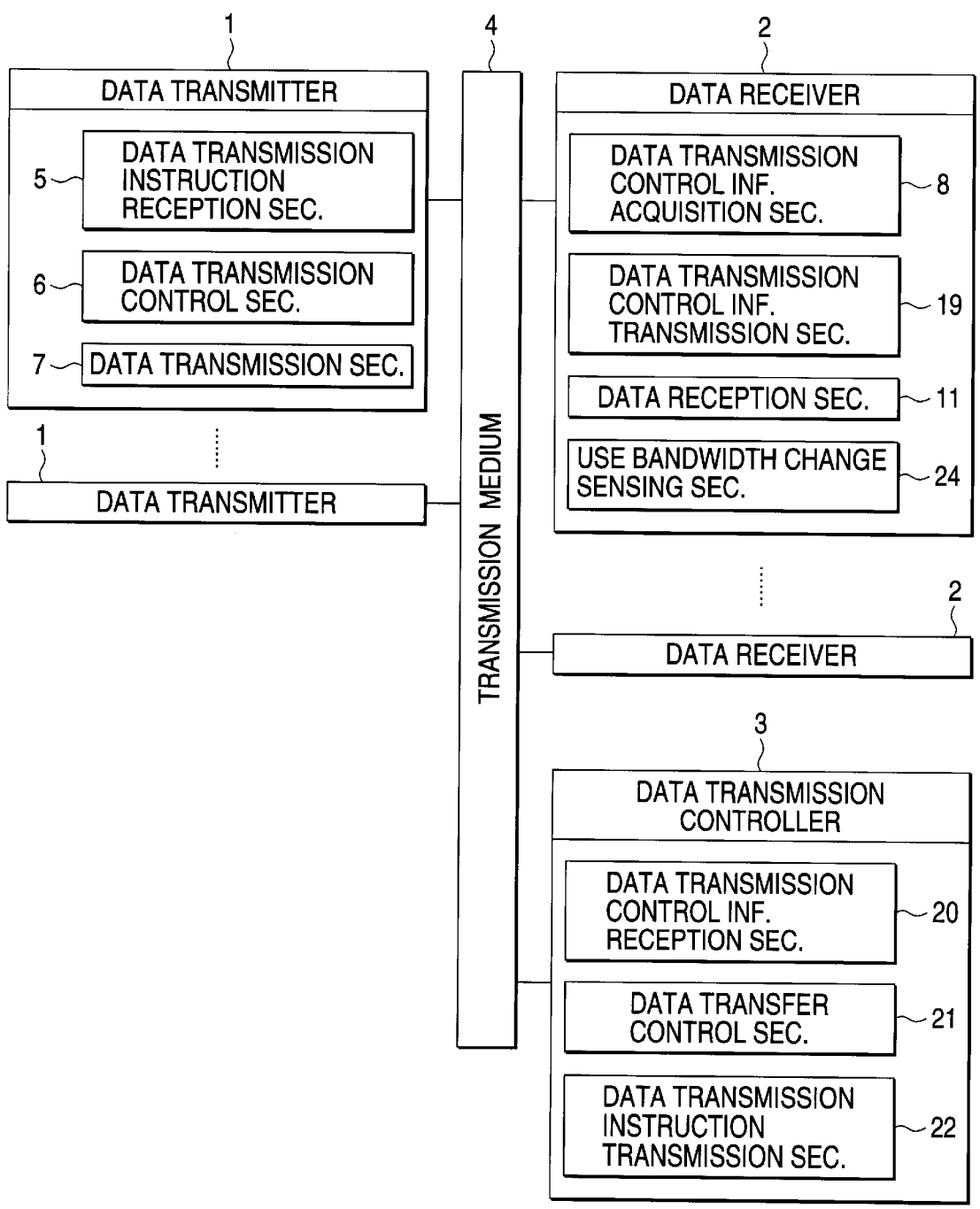
FIG. 18 is a block diagram to show an eighth embodiment of the invention.

FIG. 18 shows the configuration of the eighth embodiment of the invention.

1. Data Transmitter 1

1-1. Data Transmission Instruction Reception Section 5 (Same as That of the Sixth Embodiment)

1-2. Data Transmission Control Section 6 (Same as That of the Sixth Embodiment)

1-3. Data Transmission Section 7 (Same as That of the Sixth Embodiment)

2. Data Receiver 2

2-1. Data Transmission Control Information Acquisition Section 8 (Same as That of the Sixth Embodiment)

2-2. Data Transmission Control Information Transmission Section 19

A data transmission control information transmission section 19 transmits data transmission control information obtained by the data transmission control information acquisition section 8 to a data transmission controller 3. If a request for data transmission changes, the data transmission control information transmission section 19 transmits data transmission control information to the data transmission controller 3.

2-3. Data Reception Section 11 (Same as That of the Sixth Embodiment)

2-4. Use Bandwidth Change Sensing Section 24

A use bandwidth change sensing section 24 monitors data reception of the data reception section 11 and if a request for data transmission changes, for example, the data transmission terminates, uses the data transmission control information transmission section 19 to transmit data transmission control information indicating the termination of the data transmission to a data transmission controller 3. To sense the termination of the data transmission, as described with FIG. 11(A) in the first embodiment, a code indicating the termination suffixed to data may be detected or the expiration of a given time interval since the data transmission stopped bandwidth use may be sensed.

3. Data Transmission Controller 3

3-1. Data Transmission Control Information Reception Section 20

Receives data transmission control information transmitted from data receivers 2.

3-2. Data Transfer Control Section 21 (Same as That of the Sixth Embodiment)

3-3. Data Transmission Instruction Transmission Section 22 (Same as That of the Sixth Embodiment)

Embodiment 9

A ninth embodiment of the invention will be discussed with reference to FIG. 19. The ninth embodiment is adapted to use a data transmitter 1 for getting data transmission control information if more than one data receiver 2 exists. Parts identical with or similar to those of the sixth embodiment will not be discussed again.

Figure 19:
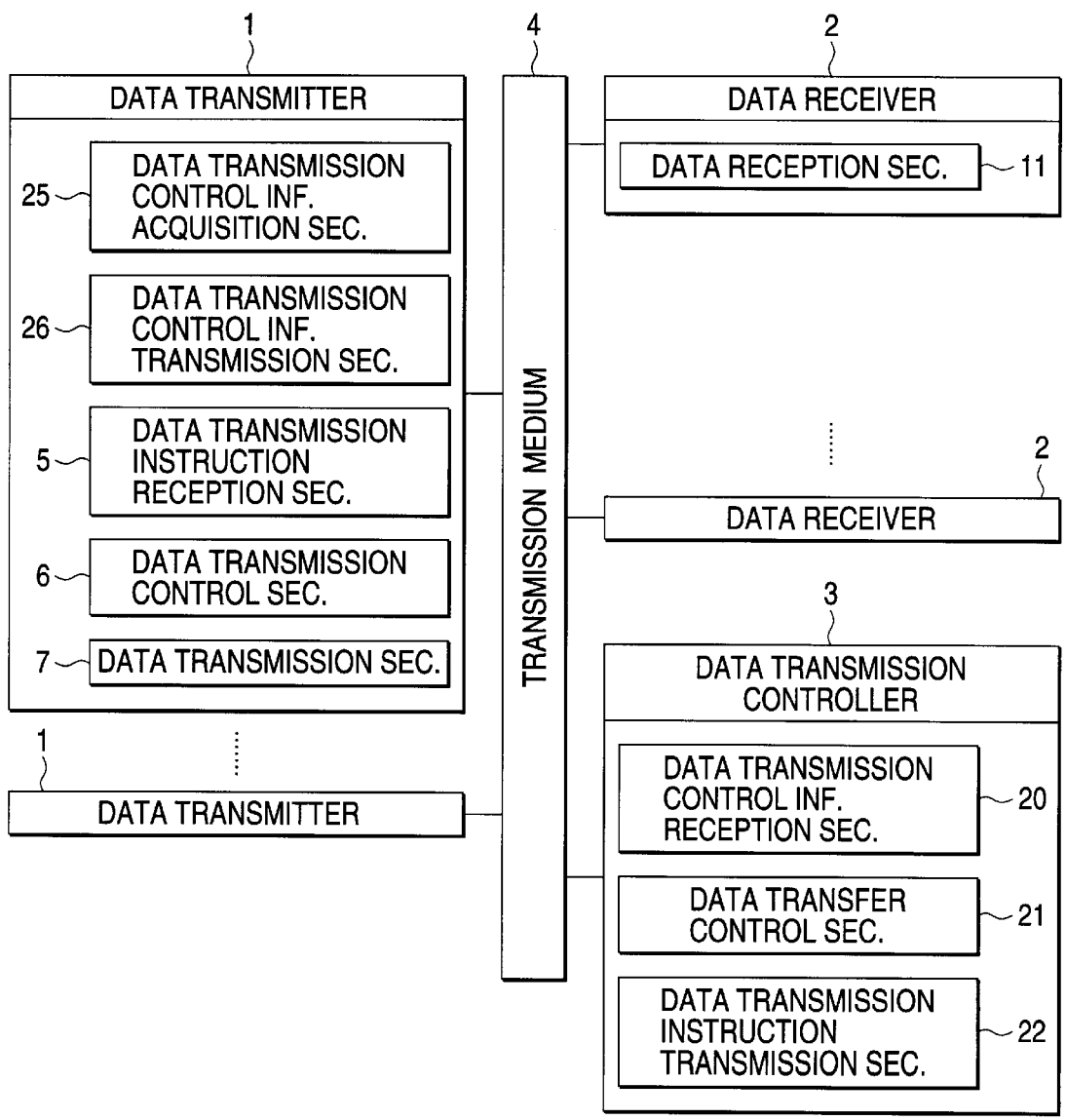
FIG. 19 is a block diagram to show a ninth embodiment of the invention.

FIG. 19 shows the configuration of the ninth embodiment of the invention.

1. Data Transmitter 1

1-1. Data Transmission Control Information Acquisition Section 25

Gets data transmission control information for data transmission based on application control information exchanged between applications before the data transmission is started.

1-2. Data Transmission Control Information Transmission Section 26

Transmits the data transmission control information obtained by the data transmission control information acquisition section 25 to a data transmission controller 3.

1-3. Data Transmission Instruction Reception Section 5 (Same as That of the Sixth Embodiment)

1-4. Data Transmission Control Section 6

A data transmission control section 6 controls the start/termination and bandwidth use amount of data transmission executed by a data transmission section 7 in accordance with data transmission instructions received by the data transmission instruction reception section 5. If a request for data transmission changes, for example, the data transmission terminates, the data transmission control section 6 uses the data transmission control information transmission section 26 to transmit data transmission control information indicating the termination of the data transmission to the data transmission controller 3.

1-5. Data Transmission Section 7 (Same as That of the Sixth Embodiment)

2. Data Receiver 2

2-1. Data Transmission Control Information Acquisition Section 8 (Same as That of the Sixth Embodiment)

2-2. Data Transmission Control Information Transmission Section 19 (Deleted From the Sixth Embodiment)

2-3. Data Reception Section 11 (Same as That of the Sixth Embodiment)

3. Data Transmission Controller 3

3-1. Data Transmission Control Information Reception Section 20

Receives data transmission control information transmitted from data transmitters 1.

3-2. Data Transfer Control Section 21 (Same as That of the Sixth Embodiment)
3-3. Data Transmission Instruction Transmission Section 22 (Same as That of the Sixth Embodiment)

Embodiment 10

A tenth embodiment of the invention will be discussed with reference to FIG. 20. The tenth embodiment assumes that applications prepare data transmission control information if more than one data receiver 2 exists. Parts identical with or similar to those of the sixth embodiment will not be discussed again.

Figure 20:
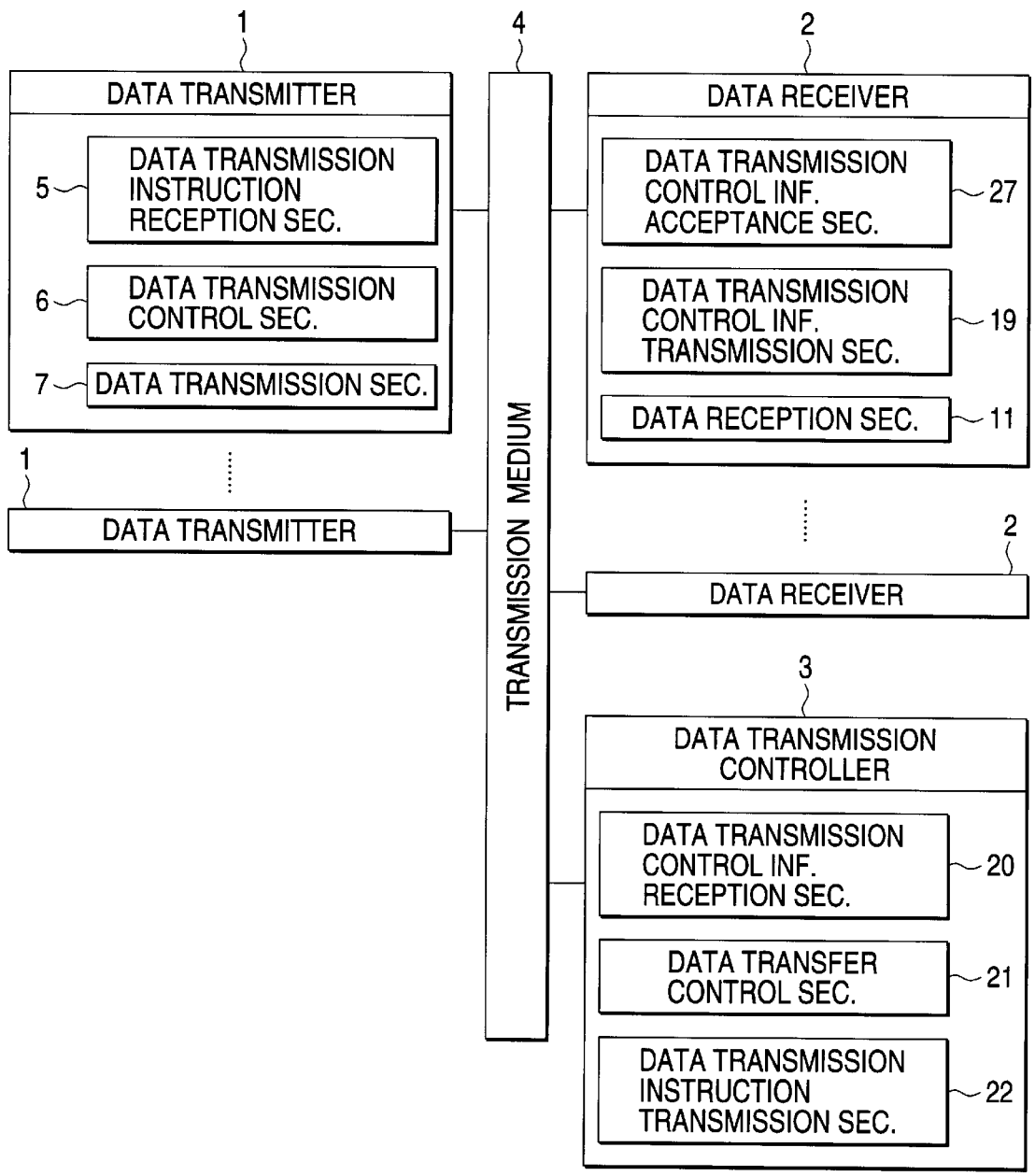
FIG. 20 is a block diagram to show a tenth embodiment of the invention.

FIG. 20 shows the configuration of the tenth embodiment of the invention.
1. Data Transmitter 1
1-1. Data Transmission Instruction Reception Section 5 (Same as That of the Sixth Embodiment)
1-2. Data Transmission Control Section 6 (Same as That of the Sixth Embodiment)
1-3. Data Transmission Section 7 (Same as That of the Sixth Embodiment)
2. Data Receiver 2
2-1. Data Transmission Control Information Acquisition Section 8 (Deleted From the Sixth Embodiment)
2-2. Data Transmission Control Information Acceptance Section 27
Accepts data transmission control information prepared explicitly by an application.
2-3. Data Transmission Control Information Transmission Section 19
Transmits data transmission control information accepted by the data transmission control information acceptance section 27 to a data transmission controller 3.
2-4. Data Reception Section 11 (Same as That of the Sixth Embodiment)
3. Data Transmission Controller 3
3-1. Data Transmission Control Information Reception Section 20 (Same as That of the Sixth Embodiment)
3-2. Data Transfer Control Section 21 (Same as That of the Sixth Embodiment)
3—3. Data Transmission Instruction Transmission Section 22 (Same as That of the Sixth Embodiment)

Embodiment 11

An eleventh embodiment of the invention will be discussed with reference to FIG. 21. In the eleventh embodiment, an application prepares data transmission control information and is notified of the data transmission instruction determination result based on the prepared data transmission control information if more than one data receiver 2 exists. Parts identical with or similar to those of the sixth embodiment will not be discussed again.

Figure 21:
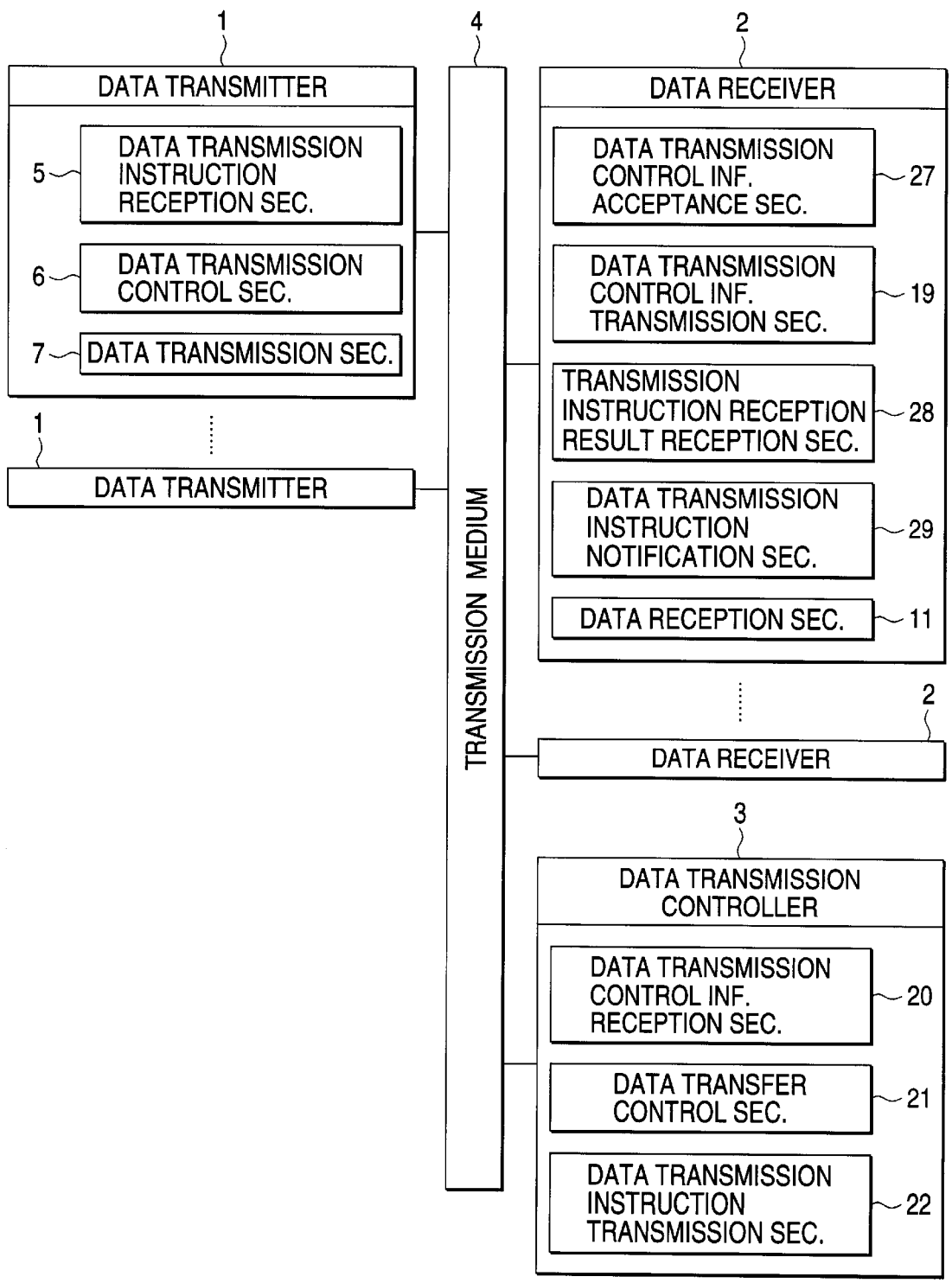
FIG. 21 is a block diagram to show an eleventh embodiment of the invention.

FIG. 21 shows the configuration of the eleventh embodiment of the invention.
1. Data Transmitter 1
1-1. Data Transmission Instruction Reception Section 5 (Same as That of the Sixth Embodiment)
1-2. Data Transmission Control Section 6 (Same as That of the Sixth Embodiment)
1-3. Data Transmission Section 7 (Same as That of the Sixth Embodiment)
2. Data Receiver 2
2-1. Data Transmission Control Information Acquisition Section 8 (Deleted From the Sixth Embodiment)
2-2. Data Transmission Control Information Acceptance Section 27
Accepts data transmission control information prepared explicitly by an application.
2-3. Data Transmission Control Information Transmission Section 19
Transmits data transmission control information accepted by the data transmission control information acceptance section 27 to a data transmission controller 3.
2-4. Instruction Reception Result Reception Section 28
Receives the data transmission instruction determination result transmitted by the data transmission controller 3.
2-5. Data Transmission Instruction Notification Section 29
Sends a notification of the data transmission instruction determination result based on the data transmission control information prepared by a data transmission control application to the application.
2-6. Data Reception Section 11 (Same as That of the Sixth Embodiment)
3. Data Transmission Controller 3
3-1. Data Transmission Control Information Reception Section 20 (Same as That of the Sixth Embodiment)
3-2. Data Transfer Control Section 21
Determines the point in time at which the data transmission of the contents of data transmission control information will be enabled and the transmission bandwidth that can be used for the data transmission based on the data transmission control information received by the data transmission control information reception section 20 and the bandwidth use conditions of the current data transmission being executed, and uses a data transmission instruction transmission section 22 to return transmission instructions indicating the determination to the associated data transmitter 1 and the associated data receiver 2.
3-3. Data Transmission Instruction Transmission Section 22
Transmits data transmission instructions to data transmitters 1 and data receivers 2.

As we have discussed above, according to the invention, the bandwidth use conditions of a transmission medium are acquired and data transmission attempts are managed in a unified manner based on the bandwidth use conditions for avoiding a data transmission contention, whereby the effective use of bandwidths can be made.

In particular, this leads to a remarkable improvement in productivity by applying the invention to data transmission in a high-speed print service of high-resolution color images.

That is, high-speed network technologies typified by the ATM enable data transmission of several tens of megabytes to 100 megabytes per second. On the other hand, demands for applications for executing data transmission on a network have also been extremely advanced and sophisticated, and may reach the performance limitations or more of data transmission via the network.

In particular, the requirements for data transmission are extremely severe in very fast print service applications of high-resolution color images.

A printer used in the very fast print service of high-resolution color images holds a mechanism having very large operation inertia, so that it can print out at very high speed during the stationary operation, but requires the lockup time on the minute order from an operation stop state again to the stationary operation. Thus, in a very fast print service of high-resolution color images, it is essential to print out without a break to make the most of the original high productivity of the printer and it is desirable for print jobs to always queue.

When a print job is transmitted to a printer server, it is once stored in a spool and after image processing of each page is performed, print-out is executed. In a very fast print service of high-resolution color images, the print required time per page is short and constant as about one second. On the other hand, the data amount of each page printed out has a wide range of several tens of kilobytes to 100 megabytes per page and the time required for image processing of the data also varies drastically from zero to several tens of seconds per page. Thus, the processing time of each page needs to be averaged and matched with the printer output speed by scheduling the print-out start order among print jobs and the image processing order of pages in a single print job. However, even if a giant printer spool capacity reaching no less than tens of gigabytes is provided, it becomes as much as a capacity for several hundred pages in terms of pages of the maximum data size or several jobs in terms of jobs; it is difficult to expect the averaging effect. Thus, the data transmission time of print jobs not arriving at the spool needs also be contained in calculation for scheduling.

However, in the conventional contention control technologies in networks, as the total of the transmission bandwidths used by data transmission attempts approaches the maximum transmission bandwidth of the transmission medium shared by the data transmission attempts, namely, as the transmission bandwidth load grows, the data transmission time per data transmission increases and it becomes more difficult to predict the termination time. Thus, in the above-mentioned application examples, users must put up with an increase in costs for avoiding a contention, such as network multiplexing/leasing, or low productivity.

In contrast, the contention control of the invention enables high bandwidth use efficiency and precise data transmission time prediction independently of the transmission bandwidth load. Therefore, in the above-mentioned application examples, it is also made possible to maintain high productivity under the heavy-load transmission bandwidth use circumstances in which the conventional contention control would be applied to transmission scheduling.

What is claimed is:

1. A method of transmitting data over a data transmission system including a data transmitter, a data receiver, and a data transmission medium for transmitting data from said data transmitter to said data receiver, wherein:

receiving comprises:
   generating characteristic information of data transmission from said data transmitter to said data receiver before execution of the data transmission, wherein the characteristic information of the data transmission contains an identifier of said data transmitter and a data amount of the data transmission;
   storing observed current bandwidth use conditions of said data transmission medium;
   determining a detailed form of the data transmission based on the observed current bandwidth use conditions and the characteristic information of the data transmission, wherein the detailed form of the data transmission contains data transmission start time and a transmission bandwidth used; and
   transmitting information concerning the detailed form of the data transmission; and transmitting comprises:
   receiving the information concerning the detailed form of the data transmission; and
   transmitting data based on the information concerning the detailed form of the data transmission.

2. The method as claimed in claim 1, wherein receiving further comprises sensing a change in the characteristic information of the data transmission.

3. The method as claimed in claim 1, wherein transmitting further comprises transmitting information concerning a characteristic change in the data transmission of said transmitter, and wherein receiving further comprises receiving the information concerning the characteristic change in the date transmission.

4. A method of transmitting data over a data transmission system comprising a data transmitter, a data receiver, a data transmission medium for transmitting data from said data transmitter to said data receiver, and a data transmission controller for controlling transmission of the data, wherein receiving comprises:

generating characteristic information of data transmission from said data transmitter to said data receiver before execution of the data transmission, wherein the characteristic information of the data transmission contains an identifier of said data transmitter and a data amount of the data transmission; and
   transmitting the characteristic information of the data transmission;

controlling comprises:
   receiving the characteristic information of the data transmission;
   storing current bandwidth use conditions of said data transmission medium;
   determining a detailed form of the data transmission based on the current bandwidth use conditions and the characteristic information of the data transmission, wherein the detailed form of the data transmission contains data transmission start time and a transmission bandwidth used; and
   transmitting information concerning the detailed form of the data transmission; and transmitting comprises:
   receiving the information concerning the detailed form of the data transmission; and
   transmitting data based on the information concerning the detailed form of the data transmission.

5. The method as claimed in claim 4, wherein receiving further comprises sensing a change in the characteristic information of the data transmission.

6. The method as claimed in claim 4, wherein transmitting further comprises transmitting information concerning a characteristic change of the data transmission of said data transmitter, and wherein controlling further comprises receiving the information concerning the characteristic change of the data transmission.

7. The method as claimed in claim 4, wherein receiving further comprises transmitting information concerning a characteristic change in the data transmission of said data transmitter, and wherein controlling further comprises receiving the information concerning the characteristic change in the data transmission.

8. The method as claimed in claim 7, wherein receiving further comprises sensing a change in the characteristic information of the data transmission being executed.

* * * * *